(12) United States Patent
Yamamoto

(10) Patent No.: US 12,139,352 B2
(45) Date of Patent: Nov. 12, 2024

(54) TRANSPORT SYSTEM, PROCESSING SYSTEM, METHOD FOR MANUFACTURING ARTICLE, AND MOTOR

(71) Applicant: CANON KABUSHIKI KAISHA, Tokyo (JP)

(72) Inventor: Takeshi Yamamoto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 195 days.

(21) Appl. No.: 17/873,360

(22) Filed: Jul. 26, 2022

(65) Prior Publication Data

US 2023/0035514 A1 Feb. 2, 2023

(30) Foreign Application Priority Data

Jul. 28, 2021 (JP) .................................. 2021-123574

(51) Int. Cl.
*B65G 54/02* (2006.01)
*B65G 43/08* (2006.01)
*H02K 41/03* (2006.01)

(52) U.S. Cl.
CPC ............. *B65G 54/02* (2013.01); *B65G 43/08* (2013.01); *H02K 41/031* (2013.01); *B65G 2203/043* (2013.01)

(58) Field of Classification Search
CPC B65G 43/08; B65G 54/02; B65G 2203/0283; C23C 14/568; H02K 41/031; H02P 25/064
USPC ......................................................... 198/805
See application file for complete search history.

(56) References Cited

U.S. PATENT DOCUMENTS

| 9,847,742 B2 | 12/2017 | Suzuki et al. | |
| 10,158,304 B2 | 12/2018 | Suzuki et al. | |
| 10,566,917 B2 | 2/2020 | Suzuki et al. | |
| 2020/0052568 A1* | 2/2020 | Yamamoto | ............. H02K 11/21 |
| 2021/0188569 A1* | 6/2021 | Yamamoto | ............ H01L 21/677 |
| 2022/0281698 A1* | 9/2022 | Yamamoto | ............. B65G 54/02 |

FOREIGN PATENT DOCUMENTS

| JP | 2020028212 A | | 2/2020 | |
| JP | 2020096514 A | * | 5/2020 | ............. B65G 54/02 |
| KR | 20120058478 A | * | 6/2012 | ............. B65G 54/02 |

* cited by examiner

*Primary Examiner* — James R Bidwell
(74) *Attorney, Agent, or Firm* — Venable LLP

(57) ABSTRACT

A transport system includes: a mover that includes at least one magnetic body; a stator that includes a plurality of coils arranged in a first direction to be able to face the at least one magnetic body and applies force to the at least one magnetic body by the plurality of coils to which current is applied; and a control unit that controls the current applied to the plurality of coils to apply the force to the at least one magnetic body in the first direction, a second direction crossing the first direction, and a third direction crossing the first direction and the second directions.

19 Claims, 22 Drawing Sheets

FIG. 8
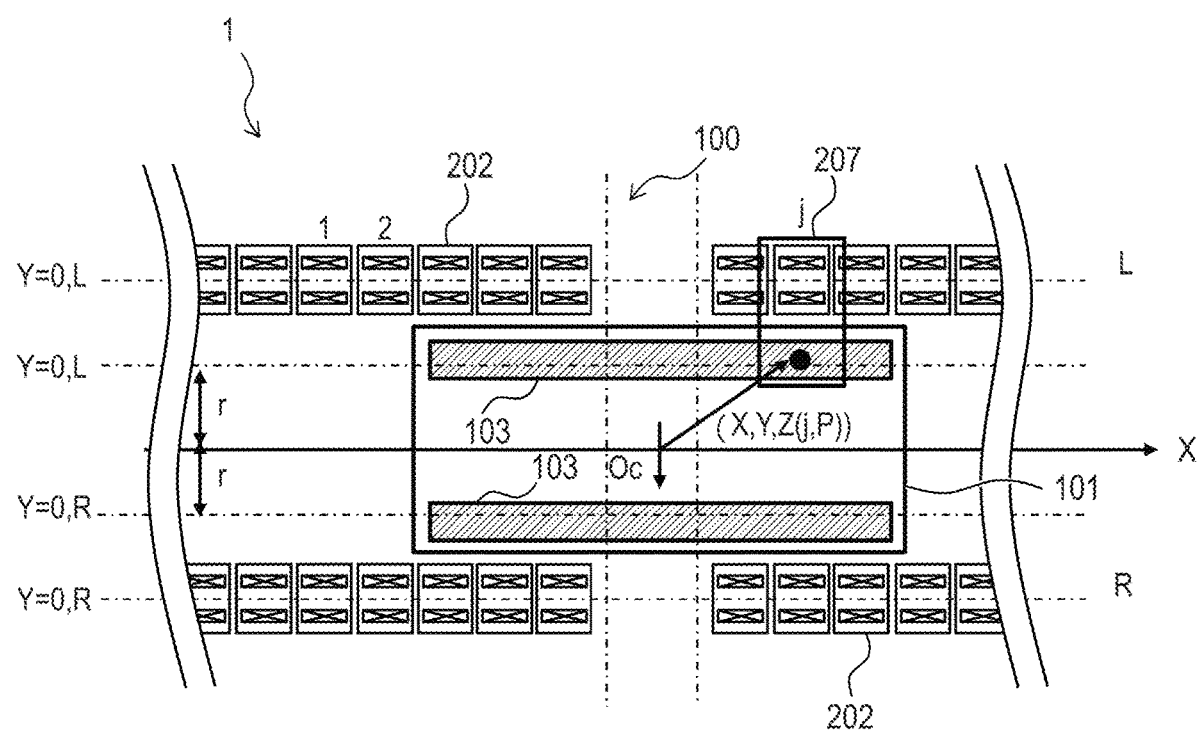
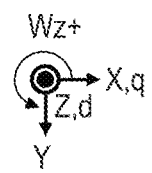

FIG. 9A
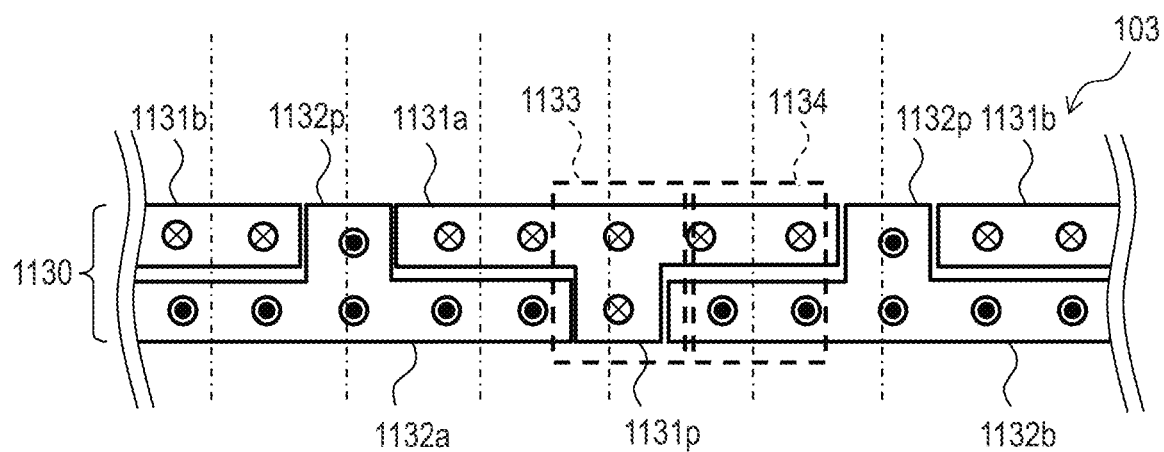
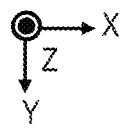
FIG. 9B
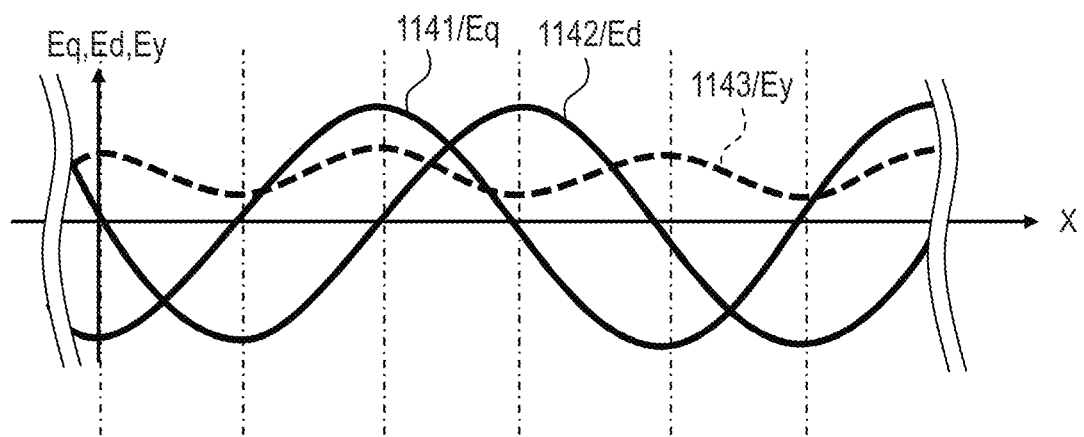

TRANSPORT SYSTEM, PROCESSING SYSTEM, METHOD FOR MANUFACTURING ARTICLE, AND MOTOR

BACKGROUND OF THE INVENTION

Field of the Invention

The present invention relates to a transport system, a processing system, a method of manufacturing an article, and a motor.

Description of the Related Art

In general, a transport system is used in a production line used for assembling industry products, a semiconductor exposure apparatus, or the like. In particular, a transport system in a production line transports workpieces such as components between a plurality of stations within a factory-automated production line or between factory-automated production lines. Further, such a transport system may be used as a transport apparatus within a process apparatus. As a transport system, a transport system with a movable magnet type linear motor has already been proposed.

In the transport system with a movable magnet type linear motor, the transport system is configured using a guiding apparatus involving mechanical contact, such as a linear guide. In the transport system using a guiding apparatus such as a linear guide, however, there is a problem of deteriorated productivity caused by a contaminant generated from a sliding portion of the linear guide, for example, a wear piece or a lubricant oil of a rail or a bearing, a volatilized substance thereof, or the like. Further, there is a problem of shortened life of a linear guide due to increased friction of a sliding portion at high speed transportation.

Japanese Patent Application Laid-Open No. 2020-28212 discloses a magnetic floating type transport system that can transport a mover in a contactless manner. In the transport system disclosed in Japanese Patent Application Laid-Open No. 2020-28212, a plurality of permanent magnets arranged along the transport direction of the mover so that the polarities of the magnetic poles are alternately different, and a plurality of magnets arranged along the direction crossing the transport direction so that the polarities of the magnetic poles are alternately different are arranged on the mover.

The transport system described in Japanese Patent Application Laid-Open No. 2020-28212 transports the mover by applying independent forces of six axes to the mover by the plurality of coils to which current is applied.

However, in the transport system disclosed in Japanese Patent Application Laid-Open No. 2020-28212, since the regions of the magnets in the transport direction and the direction orthogonal to the transport direction are divided in a plane, there is a bias in the force per unit current applied to the coil. Therefore, in the transport system disclosed in Japanese Patent Application Laid-Open No. 2020-28212, it may be difficult to stably transport the mover, especially in the case of a small mover or in the case where the arrangement of stators is greatly restricted.

SUMMARY OF THE INVENTION

According to one aspect of the present invention, there is provided a transport system including: a mover that includes at least one magnetic body; a stator that includes a plurality of coils arranged in a first direction to be able to face the at least one magnetic body and applies force to the at least one magnetic body by the plurality of coils to which current is applied; and a control unit that controls the current applied to the plurality of coils to apply the force to the at least one magnetic body in the first direction, a second direction crossing the first direction, and a third direction crossing the first direction and the second directions.

Further features of the present invention will become apparent from the following description of exemplary embodiments with reference to the attached drawings.

BRIEF DESCRIPTION OF THE DRAWINGS

FIG. 8 is a plan view illustrating a configuration of the transport system according to the first embodiment of the present invention.

FIG. 9A is a schematic diagram illustrating magnetic bodies disposed on a mover in a transport system according to a second embodiment of the present invention.

FIG. 9B is a graph schematically illustrating thrust constant profiles in the q-axis direction, the d-axis direction, and the Y-axis direction in the transport system according to a second embodiment of the present invention.

DESCRIPTION OF THE EMBODIMENTS

First Embodiment

A first embodiment of the present invention will be described with reference to FIG. 1 to FIG. 6.

Figure 1:
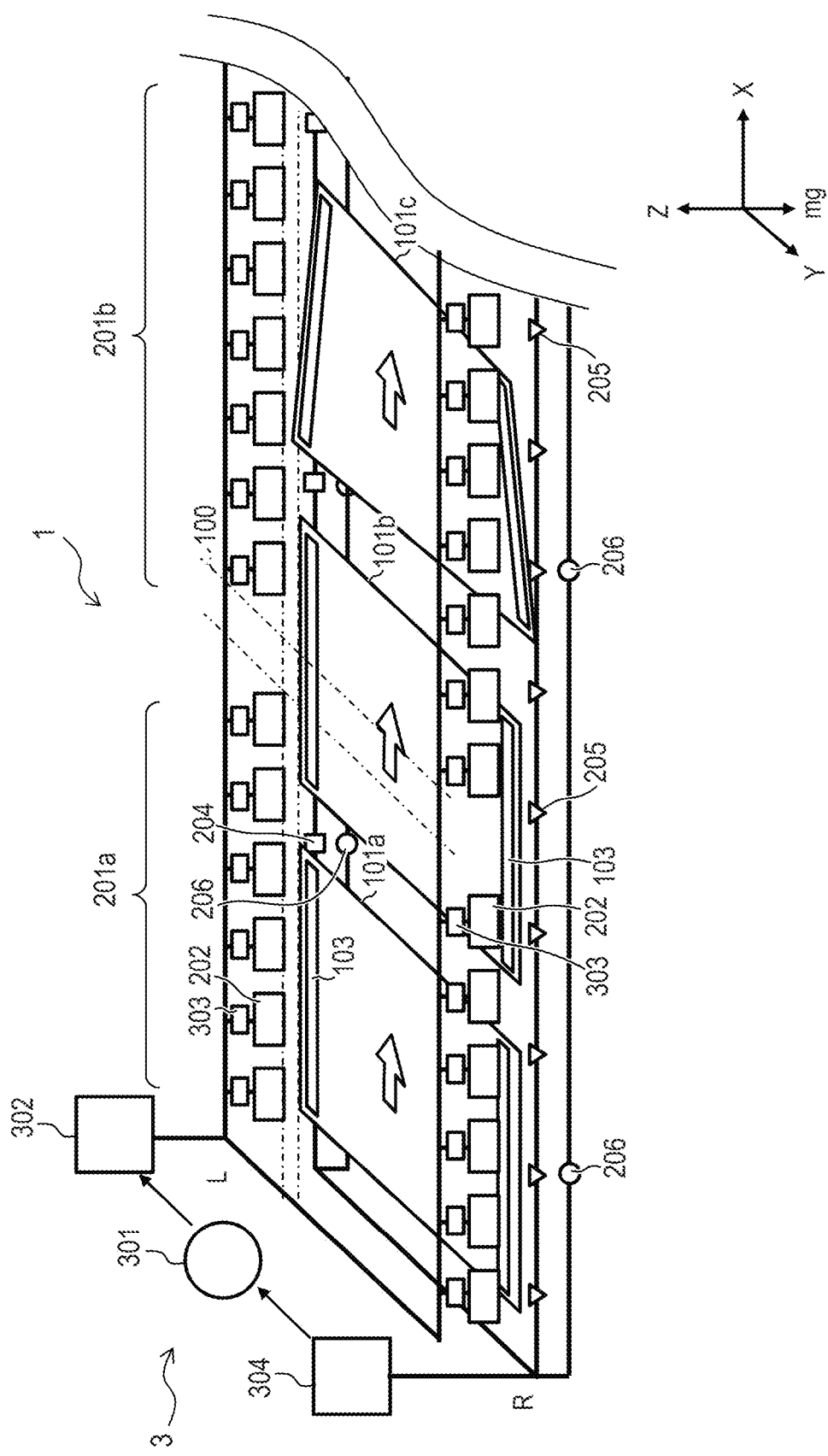
FIG. 1 is a schematic diagram illustrating a configuration of a transport system according to a first embodiment of the present invention.
Figure 2:
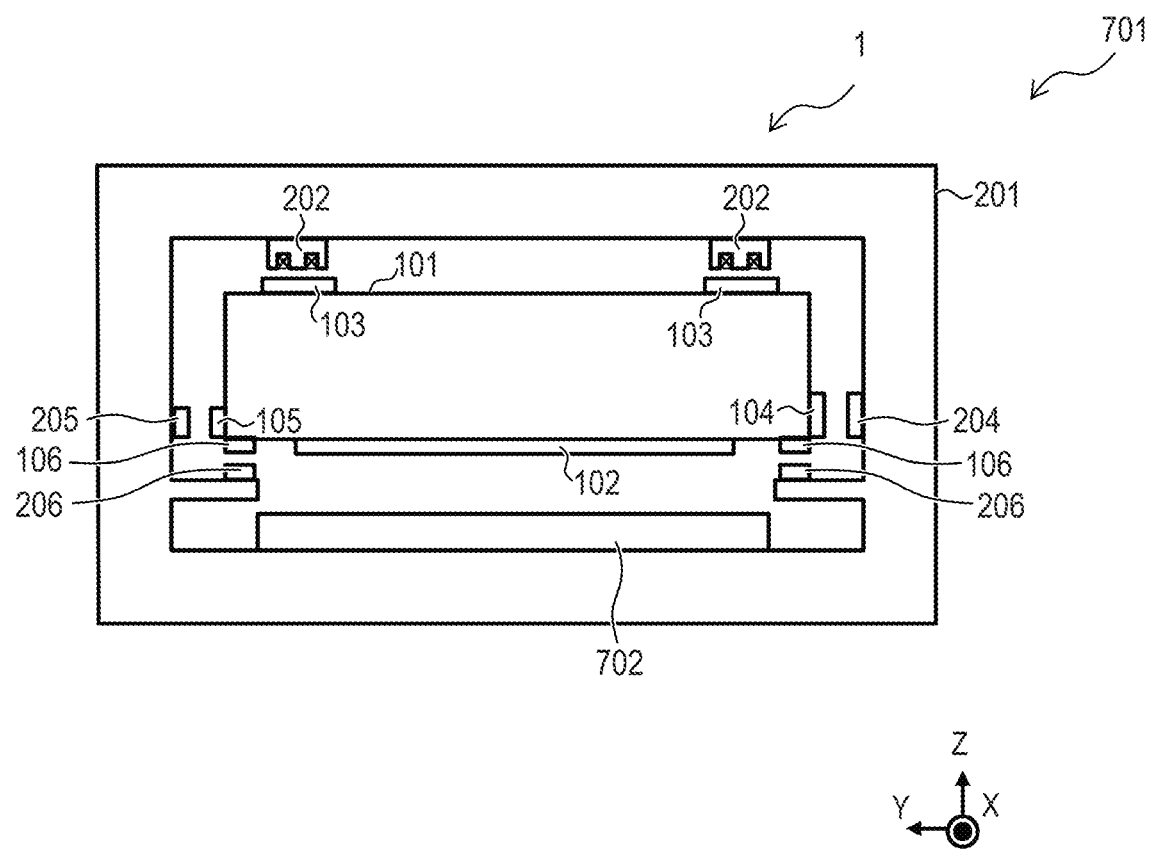
FIG. 2 is a schematic diagram illustrating a configuration of the transport system according to a first embodiment of the present invention.
Figure 3:
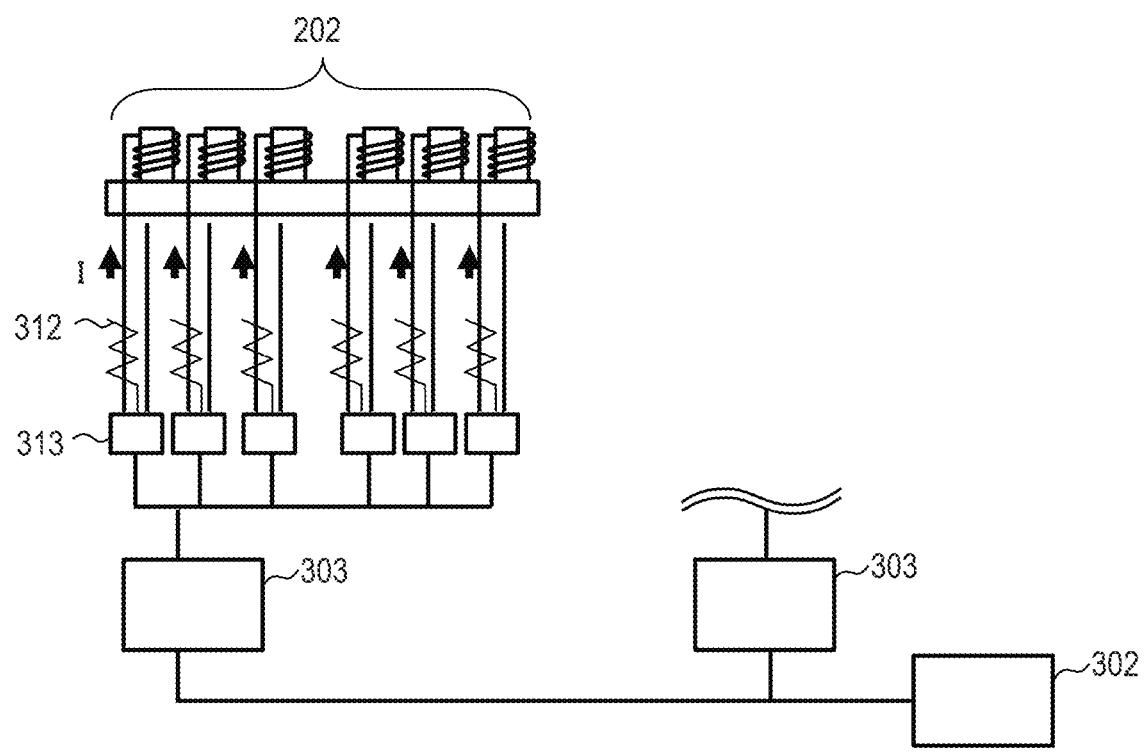
FIG. 3 is a schematic diagram illustrating coils and a configuration related to the coils in the transport system according to the first embodiment of the present invention.

First, a configuration of a transport system 1 according to the present embodiment will be described with reference to FIG. 1 to FIG. 3. FIG. 1 and FIG. 2 are schematic diagrams illustrating the configuration of the transport system 1 including movers 101 and stators 201 according to the present embodiment. Note that FIG. 1 and FIG. 2 are views of extracted main portions of each mover 101 and each stator 201, respectively. Further, FIG. 1 is a diagram of the mover 101 when viewed from a diagonally upper side, and FIG. 2 is a diagram of the mover 101 and the stator 201 when viewed from the X direction described later. FIG. 3 is a schematic diagram illustrating coils 202 and a configuration related to the coils 202 in the transport system 1.

As illustrated in FIG. 1 and FIG. 2, the transport system 1 according to the present embodiment has the mover 101 forming a carrier, a carriage, or a slider and the stator 201 forming a transport path. Further, the transport system 1 has an integration controller 301, coil controllers 302, coil unit controllers 303, and a sensor controller 304. Note that FIG. 1 illustrates three movers 101a, 101b, and 101c as the mover 101 and two stators 201a and 201b as the stator 201. In the following description, a reference including only the numeral common to others is used when it is not particularly required to distinguish components that may be present as multiple components, such as the mover 101 and the stator 201, and a lowercase alphabet is appended to a numeral reference to distinguish the individuals if necessary. Further, when a component of the mover 101 on the R side and a component on the L side of the mover 101 are distinguished from each other, "R" indicating the R side or "L" indicating the L side is appended to the lowercase alphabet.

The transport system 1 according to the present embodiment is a transport system with an inductive type linear motor that generates electromagnetic force between the coil 202 of the stator 201 and a magnetic body 103 of the mover 101 to transport the mover 101. Further, the transport system 1 according to the present embodiment is a magnetic floating type transport system that causes the mover 101 to float and transports the mover 101 in a contactless manner. The transport system 1 according to the present embodiment forms a part of a processing system having a process apparatus together that performs processing on a workpiece 102 transported by the mover 101.

The transport system 1 transports the workpiece 102 held by the mover 101 to a process apparatus that performs a processing operation on the workpiece 102 by transporting the mover 101 by the stator 201, for example. The process apparatus is not particularly limited and may be, for example, a film forming apparatus such as a vapor deposition apparatus, a sputtering apparatus, or the like to form a film on a glass substrate that is the workpiece 102. Note that, although FIG. 1 illustrates three movers 101 for two stators 201, the number is not limited thereto. In the transport system 1, one or a plurality of movers 101 may be transported on one or a plurality of stators 201.

Herein, coordinate axes, directions, and the like used in the following description are defined. First, an X-axis is taken along the horizontal direction that is the transport direction of the mover 101, and the transport direction of the mover 101 is defined as the X direction. Further, a Z-axis is taken along the perpendicular direction that is a direction orthogonal to the X direction, and the perpendicular direction is defined as a Z direction. The perpendicular direction corresponds to a direction of the gravity (mg direction). Further, a Y-axis is taken is taken along a direction orthogonal to the X direction and the Z direction, and the direction orthogonal to the X direction and the Z direction is defined as a Y direction. Furthermore, a rotation direction around the X-axis is defined as a Wx direction, a rotation direction around the Y-axis is defined as a Wy direction, and a rotation direction around the Z-axis is defined as a Wz direction. Further, "*" is used as a multiplication symbol. Further, the center of the mover 101 is defined as origin Oc, the +Y side is denoted as R side, and the −Y side is denoted as L side. Note that, although the transport direction of the mover 101 is not necessarily required to be a horizontal direction, the Y direction and the Z direction can be similarly defined also in such a case with the transport direction being defined as the X direction. Note that the X direction, the Y direction, and the Z direction are not necessarily limited to directions orthogonal to each other and can be defined as directions crossing each other.

Further, a displacement in the transport direction is defined as a position, a displacement in other directions is defined as an attitude, and the position and the attitude together are defined as a state. Further, denotation of the q-axis and the d-axis used in the following description is the same as the denotation of the q-axis and the d-axis in vector control generally used in synchronous motor control, respectively. A direction along the q-axis is defined as the q-axis direction, and a direction along the d-axis is defined as the d-axis direction. In the present embodiment, the q-axis corresponds to the X-axis and the d-axis corresponds to the Z-axis. The q-axis direction corresponds to the X direction and the d-axis direction corresponds to the Z direction.

Further, symbols used in the following description are as follows.

Oc: the origin of the mover 101
j: index for identifying the coil 202
(Note that j is an integer satisfying $1 \leq j \leq N$, where N is an integer greater than or equal to two.)
N: the number of the installed coils 202
Ij: current amount applied to the j-th coil 202
P: state including the position and the attitude of the mover 101 (X, Y, Z, Wx, Wy, Wz)
X(j, P): X-coordinate of a permanent magnet facing the j-th coil 202 from the center of the mover 101 in a state P
Y(j, P): Y-coordinate of the permanent magnet facing the j-th coil 202 from the center of the mover 101 in the state P
Z(j, P): Z-coordinate of the permanent magnet facing the j-th coil 202 from the center of the mover 101 in a state P
Note that the permanent magnet is included in the magnetic body 103 of the mover 101 as described later.
Eq(j, P): force in the q-axis direction working on the mover 101 in the state P when unit current is applied to the j-th coil 202
Ed(j, P): force in the d-axis direction working on the mover 101 in the state P when unit current is applied to the j-th coil 202
Ey(j, P): force in the Y direction working on the mover 101 in the state P when unit current is applied to the j-th coil 202
T: force applied to the mover 101
Tx: force component in the X direction of force T
Ty: force component in the Y direction of force T
Tz: force component in the Z direction of force T
Twx: torque component in the Wx direction of force T
TWy: torque component in the Wy direction of force T
Twz: torque component in the Wz direction of force T
Σ: sum when the index j is changed from 1 to N
ΣL: sum when the index of the coil 202 on the L side is changed
ΣR: sum when the index of the coil 202 on the R side is changed
\*: product of matrixes, vectors, or matrix and vector
M: torque contribution matrix
K: pseudo-current vector (column vector)
Tq: torque vector (column vector)
Is: coil current vector (column vector)
Fs: coil force vector (column vector)
M(a, b): element on the a-th row and on the b-th column of the torque contribution matrix M
Inv( ): inverse matrix
Tr( ): transpose matrix
Tr(element 1, element 2, . . . ): column vector whose elements are element 1, element 2, . . .

As indicated by arrows in FIG. 1, the mover 101 is configured to be movable in the X direction that is the transport direction. The mover 101 has magnetic bodies 103, a linear scale 104, a Y target 105, and Z targets 106.

The magnetic bodies 103 are attached and installed along the X direction at respective ends on the R side and the L side on the top face of the mover 101. Each of the magnetic bodies 103 has a permanent magnet group 1102, a permanent magnet group 1103, and the like, as will be described later. Note that the installation places and the number of the magnetic bodies 103 are not limited to the cases illustrated in FIG. 1 and FIG. 2, and can be changed as appropriate.

The linear scale 104, the Y-target 105, and the Z-target 106 are attached and installed in the mover 101 at positions that can be read by the linear encoder 204, the Y-sensor 205, and the Z-sensor 206 installed on the stator 201, respectively.

The stator 201 has the coils 202, the linear encoders 204, the Y sensors 205, and the Z sensors 206.

A plurality of coils 202 are attached and installed along the X direction on the stator 201 so as to be able to face, along the X direction, the magnetic bodies 103 installed on the top surface of the mover 101. Specifically, the plurality of coils 202 are arranged and installed in two lines along the X direction so as to be able to face the two magnetic bodies 103 arranged on the ends of the R side and the L side of the top surface of the mover 101 from above along the Z direction. Note that the installation place and the number of the coils 202 are not limited to the cases illustrated in FIG. 1 and FIG. 2, and can be appropriately changed.

The stator 201 applies force to the mover 101 that is movable in the transport direction by each coil 202 to which a current is applied. Thereby, the mover 101 is transported in the transport direction while the position and attitude thereof are controlled.

The linear encoder 204, the Y sensor 205, and the Z sensor 206 function as a detection unit that detects the position and attitude of the mover 101 that moves in the transport direction.

The linear encoder 204 is attached and installed on the stator 201 so as to be able to read the linear scale 104 installed on the mover 101. The linear encoder 204 detects the relative position to the linear encoder 204 of the mover 101 by reading the linear scale 104.

The Y-sensor 205 is attached and installed on the stator 201 so as to be able to detect the distance in the Y direction to the Y-target 105 installed on the mover 101.

The Z-sensor 206 is attached and installed on the stator 201 so as to be able to detect the distance in the Z direction to the Z-target 106 installed on the mover 101.

The mover 101 is configured to be transported with the workpiece 102 attached or held above or under the mover 101, for example. Note that FIG. 2 illustrates a state where the workpiece 102 is attached under the mover 101. Note that the mechanism used for attaching or holding the workpiece 102 to the mover 101 is not particularly limited, and a general attaching mechanism, a general holding mechanism, or the like such as a mechanical hook, an electrostatic chuck, or the like may be used.

Note that FIG. 2 illustrates a case where the mover 101 and the stator 201 are embedded inside a chamber of a vapor deposition apparatus 701 that is an example of the process apparatus that performs a processing operation on the workpiece 102. The vapor deposition apparatus 701 has a vapor deposition source 702 that performs deposition on the workpiece 102 attached to the mover 101. The vapor deposition source 702 is installed on a lower part inside the chamber of the vapor deposition apparatus 701 so that the vapor deposition source 702 can face the workpiece 102 attached under the mover 101. With vapor deposition using the vapor deposition source 702, a thin film of a metal, an oxide, or the like is formed on a substrate that is the workpiece 102 attached under the mover 101 transported to an installation place of the vapor deposition source 702. In such a way, the workpiece 102 together with the mover 101 is transported, processing is performed on the transported workpiece 102 by the process apparatus, and an article is manufactured.

Further, FIG. 1 illustrates a region including a place where a structure 100 such as a gate valve, for example, is present between the stator 201a and the stator 201b. The place where the structure 100 is present is a place which is located between a plurality of stations within a production line or between a plurality of stations between production lines and where continuous arrangement of electromagnets or coils is not possible.

A control system 3 that controls the transport system 1 is provided to the transport system 1. Note that the control system 3 may form a part of the transport system 1. The control system 3 has the integration controller 301, the coil controller 302, the coil unit controllers 303, and the sensor controller 304. The integration controller 301, the coil controller 302, the coil unit controllers 303, and the sensor controller 304 execute the respective processes by executing control programs corresponding to the respective processes to execute various calculations. The coil controller 302 and the sensor controller 304 are connected to the integration controller 301 in a communicable manner. The plurality of coil unit controllers 303 are connected to the coil controller 302 in a communicable manner. The plurality of linear encoders 204, the plurality of Y-sensors 205, and the plurality of Z-sensors 206 are connected to the sensor controller 304 in a communicable manner. The coil 202 is connected to each of the coil unit controllers 303.

The integration controller 301 determines current instruction values to be applied to the plurality of coils 202 based on the output from the linear encoder 204, the Y-sensor 205, and the Z-sensor 206 transmitted from the sensor controller 304. The integration controller 301 transmits the determined current instruction values to the coil controller 302. The coil controller 302 transmits the current instruction values received from the integration controller 301 to respective coil unit controllers 303. The coil unit controller 303 controls the current amount of the connected coil 202 based on the current instruction value received from the coil controller 302.

As illustrated in FIG. 3, one or a plurality of coils 202 are connected to each coil unit controller 303. A current sensor 312 and a current controller 313 are connected to the coil 202. The current sensor 312 detects a current value flowing through the connected coil 202. The current controller 313 controls the amount of current flowing through the connected coil 202.

The coil unit controller 303 instructs the current controller 313 for a desired current amount based on the current instruction value received from the coil controller 302. The current controller 313 detects the current value detected by the current sensor 312 and controls the current amount so that current of a desired current amount flows in the coil 202.

Figure 4:
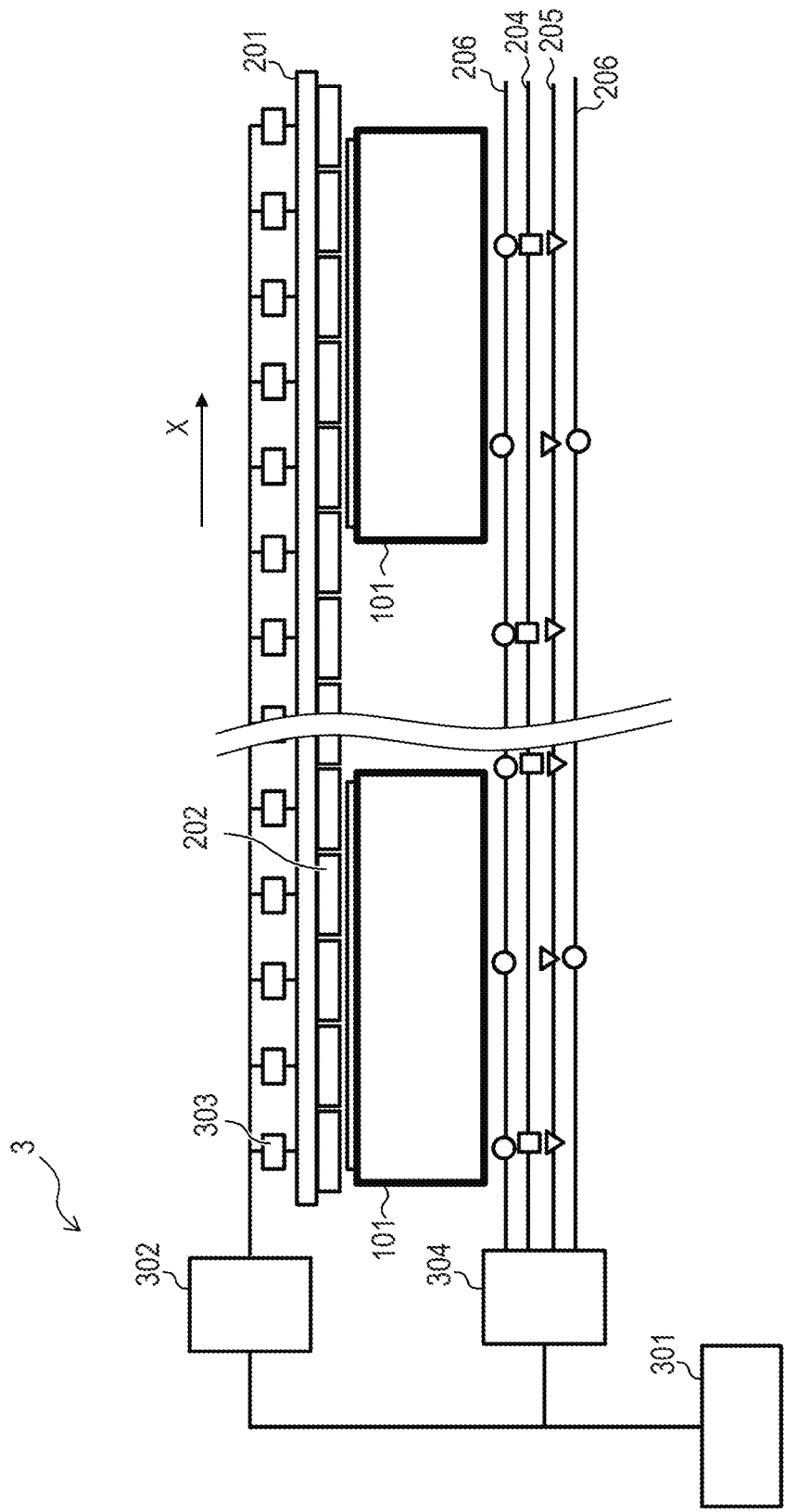
FIG. 4 is a schematic diagram illustrating a control system that controls the transport system according to the first embodiment of the present invention.

Next, the control system 3 that controls the transport system 1 according to the present embodiment will be further described with reference to FIG. 4. FIG. 4 is a schematic diagram illustrating the control system 3 that controls the transport system 1 according to the present embodiment.

As illustrated in FIG. 4, the control system 3 has the integration controller 301, the coil controller 302, the coil unit controllers 303, and the sensor controller 304. The control system 3 functions as a control apparatus that controls the transport system 1 including the mover 101 and the stator 201. The coil controller 302 and the sensor controller 304 are connected to the integration controller 301 in a communicable manner.

The plurality of coil unit controllers 303 are connected to the coil controller 302 in a communicable manner. The coil controller 302 and the plurality of coil unit controllers 303 connected thereto are provided in association with respective columns of the coils 202. The coil 202 is connected to each coil unit controller 303.

The coil controller 302 instructs target current values to each of the connected coil unit controllers 303. The coil unit controller 303 controls the current amount of the connected coil 202.

The plurality of linear encoders 204, the plurality of Y-sensors 205, and the plurality of Z-sensors 206 are connected to the sensor controller 304 in a communicable manner.

The plurality of linear encoders 204 are attached to the stator 201 at intervals such that one of the linear encoders 204 can always measure the position of one mover 101 even during transportation of the mover 101. Further, the plurality of Y-sensors 205 are attached to the stator 201 at intervals such that two of the Y-sensors 205 can always measure the Y-target 105 of one mover 101. Further, the plurality of Z-sensors 206 are attached to the stator 201 at intervals such that three of the two lines of Z-sensors 206 can always measure the Z-target 106 of one mover 101 and so as to form a plane.

The integration controller 301 determines current instruction values to be applied to the plurality of coils 202 based on the output from the linear encoders 204, the Y-sensors 205, and the Z-sensors 206 and transmits the current instruction values to the coil controllers 302. The coil controller 302 instructs the coil unit controllers 303 for the current values based on the current instruction values from the integration controller 301 as described above. Accordingly, the integration controller 301 functions as a control unit to transport the mover 101 in a contactless manner along the stator 201 and control the attitude of the transported mover 101 in six axes.

Figure 5:
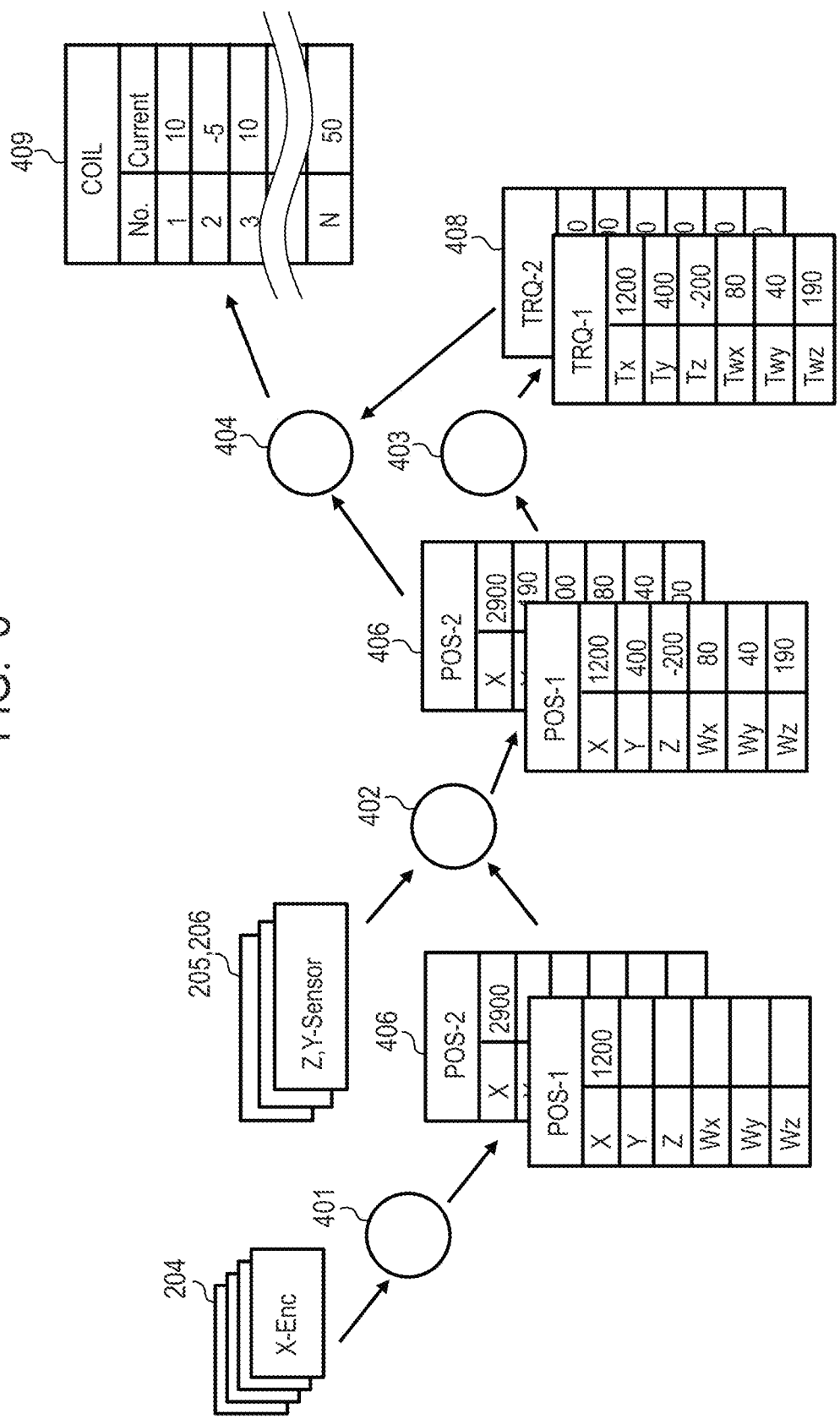
FIG. 5 is a schematic diagram illustrating an attitude control method of a mover in the transport system according to the first embodiment of the present invention.

The integration controller 301 controls the current applied to the plurality of coils 202 based on the position and the attitude of the movers 101 acquired by the linear encoder 204, the Y sensor 205 and the Z sensor 206. The attitude control method of the mover 101 performed by the integration controller 301 will be described below with reference to FIG. 5. FIG. 5 is a schematic diagram illustrating the attitude control method of the mover 101 in the transport system 1 according to the present embodiment. FIG. 5 illustrates the overview of the attitude control method of the mover 101 by mainly focusing on the data flow. The integration controller 301 functions as a control unit that performs a process using a mover position calculation function 401, a mover attitude calculation function 402, a mover attitude control function 403, and a coil current calculation function 404 as described below. Accordingly, the integration controller 301 controls transport of the mover 101 while controlling the attitude of the mover 101 in six axes. Note that, instead of the integration controller 301, the coil controller 302 can perform the same process as the integration controller 301.

First, the mover position calculation function 401 is used to calculate the number and the positions of the movers 101 on the stator 201, which forms a transport path, in accordance with the measured values from the plurality of linear encoders 204 and information on the attachment position thereof. Thereby, the mover position calculation function 401 updates mover position information (X) and number information in mover information 406 that is information on the mover 101. The mover position information (X) illustrates the position in the X direction that is the transport direction of the mover 101 on the stator 201. The mover information 406 is prepared for each mover 101 on the stator 201 as indicated as POS-1, POS-2, . . . in FIG. 5, for example.

Next, the mover attitude calculation function 402 is used to determine the Y-sensor 205 and the Z-sensor 206 that can measure respective movers 101 from the mover position information (X) in the mover information 406 updated by the mover position calculation function 401. Next, the mover attitude calculation function 402 calculates attitude information (Y, Z, Wx, Wy, Wz) that is information on the attitude of each mover 101 based on the values output from the determined Y-sensor 205 and the determined Z-sensor 206 and updates the mover information 406. The mover information 406 updated by the mover attitude calculation function 402 includes the mover position information (X) and the attitude information (Y, Z, Wx, Wy, Wz).

Next, the mover attitude control function 403 is used to calculate application force information 408 for each mover 101 from the current mover information 406 including the mover position information (X) and the attitude information (Y, Z, Wx, Wy, Wz) and an attitude target value. The application force information 408 is information related to the magnitude of force to be applied to each mover 101. The application force information 408 includes information related to three-axis components of force (Tx, Ty, Tz) and three-axis components of torque (Twx, Twv, Twz) of force T to be applied described later. The application force information 408 is prepared for each mover 101 on the stator 201 as indicated as TRQ-1, TRQ-2, . . . in FIG. 5, for example.

Herein, Tx, Ty, and Tz, which are three-axis components of force, are an X direction component, a Y direction component, and a Z direction component of force, respectively. Further, Twx, Twy, and Twz, which are three-axis components of torque, are a component around the X-axis, a component around the Y-axis, and a component around the Z-axis of torque, respectively. The transport system 1 according to the present embodiment controls transport of the mover 101 while controlling the attitude of the mover 101 in six axes by controlling these six-axis components (Tx, Ty, Tz, Twx, Twy, Twz) of force T.

Next, the coil current calculation function 404 is used to determine a current instruction value 409 applied to respective coil 202 based on the application force information 408 and the mover information 406.

In such a way, the integration controller 301 determines the current instruction value 409 by performing a process using the mover position calculation function 401, the mover attitude calculation function 402, the mover attitude control function 403, and the coil current calculation function 404. The integration controller 301 transmits the determined current instruction value 409 to the coil controller 302.

Figure 6:
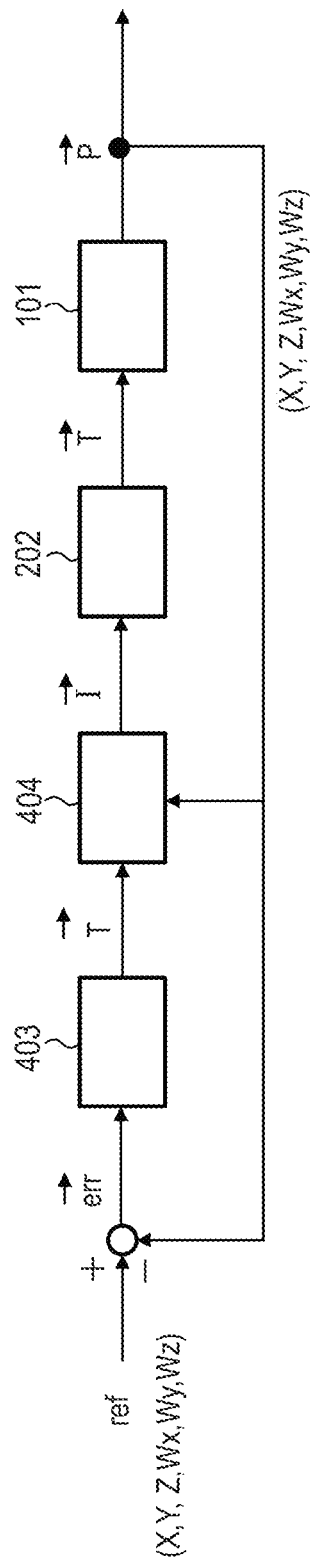
FIG. 6 is a schematic diagram illustrating an example of a control block for controlling the position and the attitude of the mover in the transport system according to the first embodiment of the present invention.

Control of the position and the attitude of the mover 101 will be further described in detail with reference to FIG. 6. FIG. 6 is a schematic diagram illustrating an example of a control block used for controlling the position and the attitude of the mover 101.

In FIG. 6, the symbol P denotes the position and the attitude (also referred to as a position and attitude or a state) of the mover 101 and has components (X, Y, Z, Wx, Wy, Wz). The symbol ref denotes a target value of (X, Y, Z, Wx, Wy, Wz). The symbol err denotes a deviation between the target value ref and the position and the attitude P.

The mover attitude control function 403 is used to calculate force T to be applied to the mover 101 for achieving the target value ref based on the level of the deviation err, the change in the deviation err, an accumulation value of the deviation err, or the like. The coil current calculation function 404 is used to calculate coil current I to be applied to the coils 202 for applying the force T to the mover 101 based on the force T to be applied and the position and the attitude P. The coil current I calculated in such a way is applied to the coils 202, and thereby the force T works on the mover 101, and the position and the attitude P changes to the target value ref.

By configuring the control block in such a way, it is possible to control the position and the attitude P of the mover 101 to a desired target value ref.

Next, the magnetic body 103 installed on the mover 101 and the coil 202 installed on the stator 201 will be described in detail with reference to FIG. 7A to FIG. 7D.

Figure 7A:
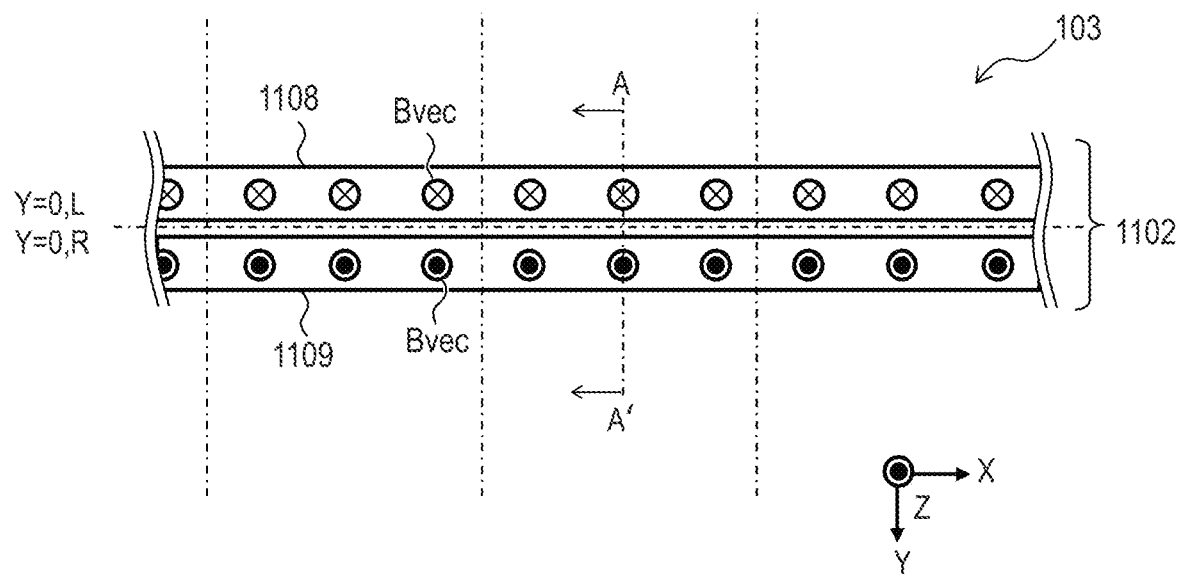
FIG. 7A is a schematic diagram illustrating magnetic bodies disposed on the mover in the transport system according to a first embodiment of the present invention.
Figure 7B:
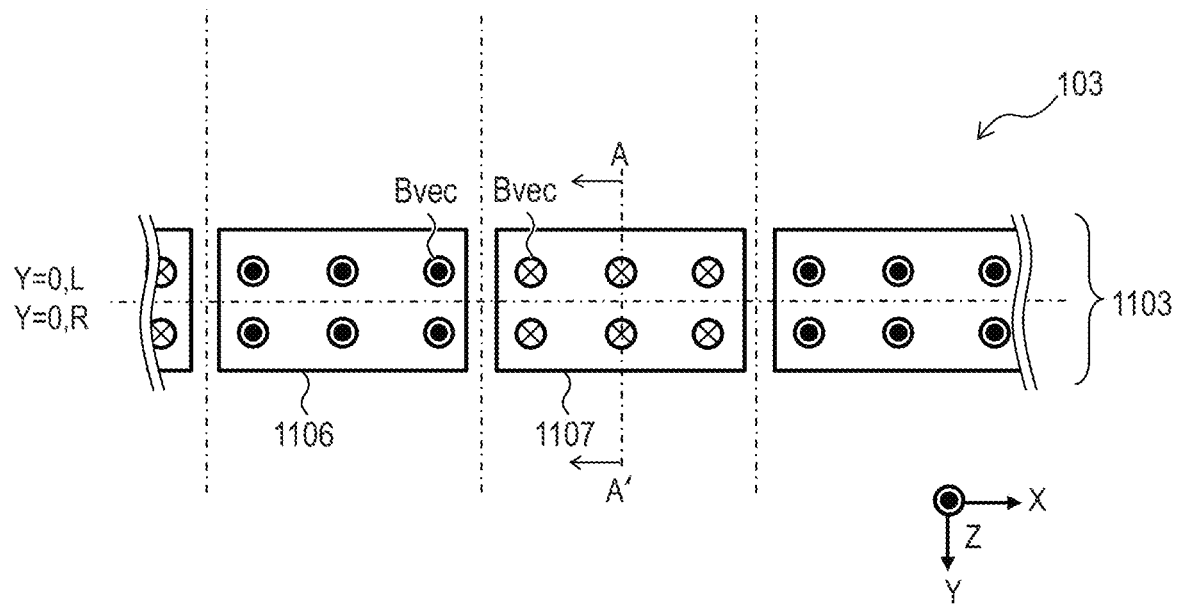
FIG. 7B is a schematic diagram illustrating magnetic bodies disposed on the mover in the transport system according to the first embodiment of the present invention.
Figure 7C:
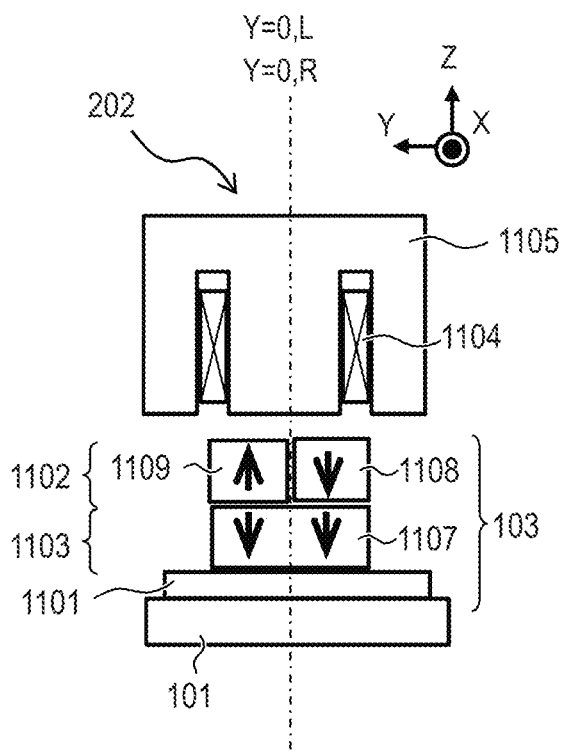
FIG. 7C is a schematic diagram illustrating the magnetic bodies disposed on the mover in the transport system according to the first embodiment of the present invention.
Figure 7D:
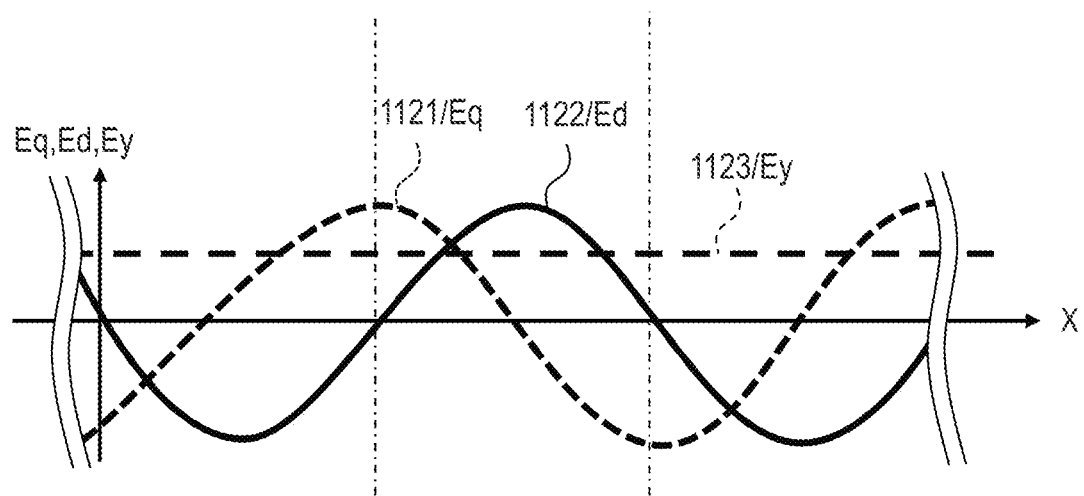
FIG. 7D is a graph schematically illustrating thrust constant profiles in the q-axis direction, the d-axis direction, and the Y-axis direction in the transport system according to a first embodiment of the present invention.

FIG. 7A to FIG. 7C illustrate an example of the magnetic body 103 installed on the mover 101. FIG. 7A is a plan view of the permanent magnets 1108 and 1109 of the permanent magnet group 1102 included in the magnetic body 103 as viewed from above along the Z direction. FIG. 7B is a plan view of the permanent magnets 1106 and 1107 of the permanent magnet group 1103 included in the magnetic body 103 as viewed from above along the Z direction. FIG. 7C is a cross-sectional view of the magnetic body 103 and the coil 202 facing the magnetic body 103 viewed along the X direction, and illustrates a cross-sectional view of the magnetic body 103 and the coil 202 along the line A-A' in FIG. 7A and FIG. 7B. The Y direction positions of Y=0, R and Y=0, L illustrated in FIG. 7A to FIG. 7C indicate reference positions on the R side and the L side, respectively. FIG. 7A to FIG. 7C illustrate a common view of the structure of the magnetic body 103 on the R side and the magnetic body 103 on the L side having the same structure. FIG. 7D is a graph schematically illustrating the magnitudes of forces acting on the magnetic body 103 in the q-axis direction, the d-axis direction, and the Y-direction per unit current of the coil 202 facing the magnetic body 103, that is, the thrust constant in each direction. In FIG. 7A, FIG. 7B and FIG. 7D, positions in the X direction corresponding to each other are indicated by o alternate long and short dash lines.

As illustrated in FIG. 7C, the coil 202 has a winding wire 1104 and an iron core 1105. The winding wire 1104 is wound around the iron core 1105 with an axis along the Z direction as a central axis. The coil 202 faces the magnetic body 103 from above the magnetic body 103 along the Z direction.

As illustrated in FIG. 7A to FIG. 7C, the magnetic body 103 includes a yoke plate 1101, a permanent magnet group 1102, and a permanent magnet group 1103. The yoke plate 1101 is installed on the top surface of the mover 101. The permanent magnet group 1103 is installed on the yoke plate 1101 in the Z direction. The permanent magnet group 1102 is installed on the permanent magnet group 1103 in the Z direction. Thus, the yoke plate 1101, the permanent magnet group 1103, and the permanent magnet group 1102 are stacked and fixed in the Z direction that is a direction in which the magnetic body 103 and the coil 202 face each other. The permanent magnet group 1102 and the permanent magnet group 1103 may have portions that repel each other depending on the direction of magnetic flux, but the permanent magnet group 1102 and the permanent magnet group 1103 are fixed to the mover 101 by adhesive or the like.

Note that the permanent magnet group 1102 and the permanent magnet group 1103 stacked in the Z direction as described above may be stacked in the Z direction in reverse to the above. That is, the permanent magnet group 1103 may be disposed on the permanent magnet group 1102 in the Z direction.

FIG. 7A and FIG. 7B schematically illustrate the directions of the magnetic fluxes flowing out of the permanent magnet groups 1102 and 1103 by Bvec. Bvec with a black circle in a white circle indicates the direction of the magnetic flux from the back side to the front side of the sheet plane along the Z direction. Bvec with a cross in a white circle indicates the direction of the magnetic flux from the front side to the back side of the sheet plane along the Z direction. In FIG. 7C, the directions of the magnetic fluxes of the permanent magnet groups 1102 and 1103 are indicated by arrows.

As illustrated in FIG. 7A, the permanent magnet group 1102 includes a permanent magnet 1108 and a permanent magnet 1109. The permanent magnets 1108 and 1109 each have a long rectangular planar shape with the X direction as the longitudinal direction in a plan view viewed from the Z direction. The permanent magnets 1108 and 1109 are arranged so as to be adjacent from the R side to the L side in the Y direction.

The permanent magnet 1108 is magnetized along the Z direction and is magnetized so that the magnetic flux is directed from the front side to the back side of the sheet plane in FIG. 7A. The permanent magnet 1109 is magnetized along the Z direction and is magnetized so that the magnetic flux is directed from the back side to the front side of the sheet plane in FIG. 7A. As described above, the permanent magnets 1108 and 1109 adjacent to each other in the Y direction are magnetized in opposite directions along the Z direction, and the directions of the magnetic fluxes along the Z direction are opposite to each other.

As illustrated in FIG. 7B, the permanent magnet group 1103 includes a plurality of permanent magnets 1106 and a plurality of permanent magnets 1107. The permanent magnets 1106 and 1107 have a rectangular planar shape that is shorter in the X direction and wider in the Y direction than the permanent magnets 1108 and 1109, respectively, when viewed in a plane view from the Z direction. The permanent magnets 1106 and 1107 are installed to be arranged alternately along the X direction.

The permanent magnet 1106 is magnetized along the Z direction and is magnetized so that the magnetic flux is directed from the back side to the front side of the sheet plane in FIG. 7B. The permanent magnet 1107 is magnetized along the Z direction and is magnetized so that the magnetic flux is directed from the front side to the back side of the sheet plane in FIG. 7B. As described above, the permanent magnets 1106 and the permanent magnets 1107 arranged alternately in the X direction are magnetized in opposite directions to each other along the Z direction, and the directions of the magnetic fluxes along the Z direction are opposite to each other.

As described above, in the present embodiment, a plurality of types of permanent magnets 1106, 1107, 1108, and 1109 having different directions and different shapes of magnetic fluxes are superposed to form the magnetic body 103. Since the plurality of types of permanent magnets 1106, 1107, 1108, and 1109 are superposed, the magnetic body 103 has a magnetic flux density distribution that changes along the X direction, which is the transport direction, and also has a magnetic flux density distribution that changes along the Y direction, which crosses the X direction.

That is, the magnetic body 103 has a magnetic flux density distribution which changes periodically along the X direction by the permanent magnets 1106 and 1107 which are alternately arranged in the X direction and whose magnetic flux directions are opposite to each other and included in the permanent magnet group 1103. The permanent magnets 1106 and 1107 forming the magnetic flux density distribution contribute to the application of force in the q-axis direction and the d-axis directions to the mover 101 that includes the magnetic body 103.

Further, the magnetic body 103 has a magnetic flux density distribution which changes so as to have a gradient along the Y direction by the permanent magnets 1108, 1109 having mutually opposite directions of magnetic fluxes adjacent to each other in the Y direction and included in the permanent magnet group 1102 stacked on the permanent magnet group 1103. The permanent magnets 1108 and 1109 forming the magnetic flux density distribution contribute to the application of force in the Y direction to the mover 101 that includes the magnetic body 103.

Thus, on the side of the magnetic body 103 facing the coil 202, a magnetic flux density distribution is formed in which the magnitude of the magnetic flux intersecting the winding wire 1104 changes in both the X direction and the Y direction when the relative position of the magnetic body 103 with respect to the coil 202 in the X direction and the Y direction change.

Therefore, the coil 202 has thrust constant profiles 1121, 1122, and 1123 illustrated in FIG. 7D in the q-axis direction, the d-axis direction, and the Y-direction, respectively. The thrust constant profile 1121 in the q-axis direction schematically illustrates force in the q-axis direction applied to the magnetic body 103 when a unit current is applied to the coil 202. The thrust constant profile 1122 in the d-axis direction schematically illustrates force in the d-axis direction applied to the magnetic body 103 when a unit current is applied to the coil 202. The thrust constant profile 1123 in the Y direction schematically illustrates force in the Y direction applied to the magnetic body 103 when a unit current is applied to the coil 202.

As described above, in the present embodiment, since the magnetic flux density distribution formed by the magnetic body 103 also changes along the Y direction, as illustrated in FIG. 7D, force in the Y direction can also be applied to the magnetic body 103 to apply force in the Y direction to the mover 101. That is, the integration controller 301 controls the current applied to the plurality of coils 202, and can apply force to the magnetic body 103 in the q-axis direction, the d-axis direction crossing the q-axis direction, and the Y-axis direction crossing the q-axis direction and the d-axis direction.

Thus, in the present embodiment, since the force applied to the mover 101 including the magnetic body 103 can be applied in the q-axis direction, the d-axis direction and the Y-direction, the force applied to the mover 101 can be made ubiquitous in the q-axis direction, the d-axis direction and the Y-direction. Therefore, even if the coil 202 does not cover the entire surface of the magnetic body 103, by applying current to the coil 202, force in the Y direction sufficient to control the state of the mover 101 can be generated.

Therefore, according to the present embodiment, the force applied to the mover 101 becomes ubiquitous, so that even in a case of the small mover 101 or in a case where the arrangement of the stator 201 is greatly limited, the mover 101 can be transported while floating in a more stable and non-contact state.

Next, a method of calculating coil current required for applying force T required for transporting the mover 101 in the transport direction to the mover 101 while controlling the attitude of the mover 101 will be further described with reference to FIG. 8. FIG. 8 is a plan view of the transport system 1 according to the present embodiment as viewed from the Z direction. The coil 202 and the magnetic body 103 are actually opposed to each other in the Z direction as illustrated in FIG. 2, but in FIG. 8, the coil 202 and the magnetic body 103 are illustrated in a staggered manner for convenience of explanation.

As illustrated in FIG. 8, the j-th coil 202 and the magnetic body 103 exert forces on each other in a predetermined range of an interaction region 207.

The respective components Tx, Ty, Tz, Twx, Twy and Twz of the force T applied to the mover 101 by the coil 202 to which the current is applied are represented by the following Equations (1a) to (1f), respectively. Tx is a force component in the X direction, Ty is a force component in the Y direction, Tz is a force component in the Z direction, Twx is a torque component in the Wx direction, Twy is a torque component in the Wy direction, and Twz is a torque component in the Wz direction.

$$Tx = \Sigma(Eq(j,P) * Ij) \qquad \text{Equation (1a)}$$

$$Ty = \Sigma(Ey(j,P) * Ij) \qquad \text{Equation (1b)}$$

$$Tz = \Sigma(Ed(j,P) * Ij) \qquad \text{Equation (1c)}$$

$$Twx = \Sigma\{(Ey(j,P) * Z(j,P) - Ed(j,P) * Y(j,P)) * Ij\} \qquad \text{Equation (1d)}$$

$$Twy = \Sigma\{(Ed(j,P) * X(j,P) - Eq(j,P) * Z(j,P)) * Ij\} \qquad \text{Equation (1e)}$$

$$Twz = \Sigma\{(Eq(j,P) * Y(j,P) - Ey(j,P) * X(j,P)) * Ij\} \qquad \text{Equation (1f)}$$

Here, the torque contribution matrix M is defined. Each element of the torque contribution matrix M is a coefficient for the current Ij of each Equations (1a) to (1f). The torque contribution matrix M is a matrix of six rows by N columns representing the magnitude of contribution to each force component and torque component (Tx, Ty, Tz, Twx, Twy, Twz) when a unit current is applied to each of the first to N-th coils 202 and when the mover 101 is in a state P. The respective elements M(1, j) to M(6, j) of the j-th column from the first row on the j-th column to the sixth row on the j-th column of the torque contribution matrix M is represented by the following Equations (1a') to (1f), respectively.

$$M(1,j) = Eq(j,P) \qquad \text{Equation (1a')}$$

$$M(2,j) = Ey(j,P) \qquad \text{Equation (1b')}$$

$$M(3,j) = Ed(j,P) \qquad \text{Equation (1c')}$$

$$M(4,j) = Ey(j,P) * Z(j,P) - Ed(j,P) * Y(j,P) \qquad \text{Equation (1d')}$$

$$M(5,j) = Ed(j,P) * X(j,P) - Eq(j,P) * Z(j,P) \qquad \text{Equation (1e')}$$

$$M(6,j) = Eq(j,P) * Y(j,P) - Ey(j,P) * X(j,P) \qquad \text{Equation (1f')}$$

Further, a coil current vector Is is defined. Each element of the coil current vector Is is a current amount applied to the j-th coil 202. Then, the coil current vector Is is a column vector on the N-th row on the first column expressed by the following Equation (2).

$$Is = Tr(I1, I2, \ldots, Ij, \ldots, IN) \qquad \text{Equation (2)}$$

Further, a torque vector Tq is defined by the following Equation (3).

$$Tq = Tr(Tx, Ty, Tz, Twx, Twy, Twz) \qquad \text{Equation (3)}$$

Then, the Equations (1a) to (1f) can be expressed by the following Equation (4) using the torque contribution matrix M, the coil current vector Is, and the torque vector Tq.

$$Tq = M * Is \qquad \text{Equation (4)}$$

Here, a pseudo current vector K is introduced here. The pseudo current vector K is a column vector having six rows by one column and is a vector satisfying the following Equation (5) when Tr(M) is a transpose matrix of the torque contribution matrix M.

$$Tr(M) * K = Is \qquad \text{Equation (5)}$$

Equation (4) can be transformed into the following Equation (6) using Equation (5).

$$Tq(M) * Tr(M) * K \qquad \text{Equation (6)}$$

Here, M*Tr(M) is a product of a matrix of six rows by N columns and its transpose matrix, and thus M*Tr(M) is a square matrix of six rows by six columns and has an inverse matrix. Thus, Equation (6) can be transformed into the following Equation (7).

$$Inv(M * Tr(M)) * Tq = K \qquad \text{Equation (7)}$$

By substituting Equation (7) into Equation (5), the coil current vector Is expressed by the following Equation (8) is obtained.

$$Tr(M) * Inv(M * Tr(M)) * Tq = Is \qquad \text{Equation (8)}$$

By calculating the coil current vector is as described above, the current to be applied to each coil 202 can be determined. Thus, the force component Tx in the X direction, the force component Ty in the Y direction, the force component Tz in the Z direction, the torque component Twx in the Wx direction, the torque component Twy in the Wy direction, and the torque component Twz in the Wz direction can be independently applied to the mover 101. Therefore, according to the present embodiment, the mover 101 can be transported more stably.

Second Embodiment

A second embodiment of the present invention will be described with reference to FIG. 9A to FIG. 10B. Note that the same components as those in the above first embodiment are labeled with the same references, and the description thereof will be omitted or simplified.

In the first embodiment, the case where the plurality of types of permanent magnets are stacked in the Z direction to configure the magnetic body 103 has been described, but the present invention is not limited thereto. A magnetic body 103 having a magnetic flux density distribution similar to that of the first embodiment can also be configured by configuring the permanent magnets configuring the magnetic body 103 such that the width in a predetermined direction is partially different in the same plane.

In the present embodiment, description will be given of a case where the magnetic body 103 is configured by a plurality of permanent magnets having partially different widths in the Y direction in a plan view viewed from the Z direction.

FIG. 9A is a plan view of the permanent magnet group 1130 included in the magnetic body 103 installed in the mover 101 according to the present embodiment, viewed from above along the Z direction. FIG. 9B is a graph schematically illustrating magnitudes of forces in the q-axis direction, the d-axis direction, and the Y-direction acting on the magnetic body 103 per unit current of the coil 202 facing the magnetic body 103, that is, thrust constants in the respective directions. In FIG. 9A and FIG. 9B, positions in the X direction corresponding to each other are indicated by alternate long and short dash lines.

As illustrated in FIG. 9A, the magnetic body 103 according to the present embodiment includes a permanent magnet group 1130 including permanent magnets 1131a, permanent magnets 1131b, permanent magnets 1132a, and permanent magnets 1132b. The permanent magnets 1131a and 1131b are arranged alternately along the X direction. The permanent magnets 1132a and 1132b are arranged so as to be adjacent to the permanent magnets 1131a and 1131b in the Y direction while being shifted in the X direction and alternately arranged in the X direction.

The permanent magnets 1131a and 1131b are magnetized along the Z direction and is magnetized so that the magnetic fluxes are directed from the front side to the back side of the sheet plane in FIG. 9A. The permanent magnets 1132a and 1132b are magnetized along the Z direction and is magnetized so that the magnetic fluxes are directed from the back side to the front side of the sheet plane in FIG. 9A. As described above, the permanent magnets 1131a and 1131b and the permanent magnets 1132a and 1132b adjacent to each other in the Y direction are magnetized in the opposite directions along the Z direction, and the directions of the magnetic fluxes along the Z direction are opposite to each other Each of the permanent magnets 1131a and 1131b has a protrusion portion 1131p protruding in the Y direction on the side of the permanent magnets 1132a and 1132b. The protrusion portion 1131p protrudes in the Y direction so as to be positioned between the permanent magnets 1132a and 1132b adjacent to the permanent magnets 1131a and 1131b in the Y direction. Since each of the permanent magnets 1131a and 1131b has the protrusion portion 1131p, each of the permanent magnets 1131a and 1131b has a shape in which the width in the Y direction is partially different, and the width in the Y direction changes. Note that the shape of each of the permanent magnets 1131a and 1131b is not limited to the shape having the protrusion portion 1131p, but may be a shape whose width changes in the Y direction.

Each of the permanent magnets 1132a and 1132b has a protrusion portion 1132p protruding in the Y direction on the side of the permanent magnets 1131a and 1131b. The protrusion portion 1132p protrudes in the Y direction so as to be positioned between the permanent magnets 1131a and 1131b adjacent to the permanent magnets 1132a and 1132b in the Y direction. Since each of the permanent magnets 1132a and 1132b has the protrusion portion 1132p, each of the permanent magnets 1132a and 1132b has a shape in which the width in the Y direction is partially different, and the width in the Y direction changes. Note that the shape of each of the permanent magnets 1132a and 1132b is not limited to the shape having the protrusion portion 1132p, but may be a shape whose width changes in the Y direction.

Thus, the magnetic body 103 is arranged so that the permanent magnets 1131 and 1132 magnetized in the opposite directions along the Z direction each other are alternately arranged along the X direction. The permanent magnets 1131 and 1132 each have the projection portions 1131p and 1132p wider than the other portions in the Y direction. The permanent magnets 1131, 1132 adjacent to each other arranged in the X direction are adjacent to each other in the Y direction except for the protrusion portions 1131p, 1132p, and are partially adjacent to each other in the Y direction.

Note that at the end portion of the magnetic body 103 in the X direction, a permanent magnet or permanent magnets corresponding to any part or parts of the permanent magnets 1131a and 1131b and the permanent magnets 1132a and 1132b are appropriately arranged so that the magnetic body 103 has a predetermined length in the X direction.

As described above, in the present embodiment, the permanent magnets 1131a and 1131b and the permanent magnets 1132a and 1132b having different magnetic flux directions are arranged so as to be arranged in the X direction while being shifted in the X direction and partially adjacent to each other in the Y direction. Furthermore, the permanent magnets 1131a and 1131b and the permanent magnets 1132a and 1132b are partially different in width in the Y direction with the protrusion portion 1131p and the protrusion portion 1132p, respectively. The magnetic body 103 thus configured has a magnetic flux density distribution that varies along the X direction, which is the transport direction, and also has a magnetic flux density distribution that varies along the Y direction crossing the X direction.

That is, the magnetic body 103 has the magnetic flux density distribution that changes periodically along the X direction due to the protrusions 1131p protruding in the Y direction of the permanent magnets 1131a and 1131b and the protrusions 1132p protruding in the Y direction of the permanent magnets 1132a and 1132b. The protrusion portions 1131p of the permanent magnets 1131a and 1131b and the protrusion portions 1132p of the permanent magnets 1132a and 1132b, which form such a magnetic flux density distribution, contribute to the application of force in the q-axis direction and the d-axis direction to the mover 101 including the magnetic body 103.

Further, the magnetic body 103 has the magnetic flux density distribution which changes so as to have a gradient along the Y direction with the portions of the permanent magnets 1131a and 1131b and the permanent magnets 1132a and 1132b which are arranged in the X direction while being shifted in the X direction and have the opposite directions of magnetic fluxes to each other and are adjacent to each other in the Y direction. The portions of the permanent magnets 1131a, 1131b, 1132a, and 1132b adjacent to each other in the Y direction to form such a magnetic flux density distribution contribute to the application of force in the Y direction to the mover 101 including the magnetic body 103.

FIG. 9B is a graph schematically illustrating magnitudes of forces in the q-axis direction, the d-axis direction, and the Y-direction acting on the magnetic body 103 per unit current of the coil 202 facing the magnetic body 103, that is, thrust constants in the respective directions.

In the present embodiment, the coil 202 has thrust constant profiles 1141, 1142, and 1143 in the q-axis direction, the d-axis direction, and the Y-direction, respectively, as illustrated in FIG. 9B. The thrust constant profile 1141 in the q-axis direction schematically illustrates force in the q-axis direction applied to the magnetic body 103 when a unit current is applied to the coil 202. The thrust constant profile 1142 in the d-axis direction schematically illustrates force in the d-axis direction applied to the magnetic body 103 when a unit current is applied to the coil 202. The thrust constant profile 1143 in the Y direction schematically illustrates force in the Y direction applied to the magnetic body 103 when a unit current is applied to the coil 202.

In FIG. 9A, for example, a case where the coil 202 is located in the region 1134 and faces the magnetic body 103 is considered. In this case, a magnetic flux density gradient in the Y direction formed by the permanent magnet 1132b and the permanent magnet 1131a exists in the magnetic flux that is in interlinkage with the coil 202 located in the region 1134. For this reason, as illustrated in FIG. 9B, in the region 1134, the thrust constant (Ey) in the Y direction does not become zero, but has a magnitude equal to or greater than a certain value.

Further, In FIG. 9A, for example, a case where the coil 202 is located in the region 1133 and faces the magnetic body 103 is considered. In this case, a magnetic flux density gradient in the Y direction formed by the permanent magnet 1132a and the permanent magnet 1131a, and a magnetic flux density gradient in the Y direction formed by the permanent magnet 1132b and the permanent magnet 1131a exists in the magnetic flux that is in interlinkage with the coil 202 located in the region 1133. For this reason, in the region 1133 also, as illustrated in FIG. 9B, the thrust constant Ey in the Y direction does not become zero, but has a magnitude equal to or greater than a certain value.

As described above, also in the present embodiment, since the thrust constant in the Y direction has a magnitude equal to or greater than a certain value, even if the force component Ty in the Y direction is equal to or greater than a certain value, desired force in the Y direction can be obtained by applying current equal to or less than a certain value to the coil 202. Therefore, by applying current to the coil 202, force in the Y direction sufficient to control the state of the mover 101 can be generated. That is, the integration controller 301 controls the current applied to the plurality of coils 202, and can apply force to the magnetic body 103 in the q-axis direction, the d-axis direction crossing the q-axis direction, and the Y-axis direction crossing the q-axis direction and the d-axis direction.

Thus, also in the present embodiment, since force applied to the mover 101 including the magnetic body 103 can be applied in the q-axis direction, the d-axis direction and the Y-direction, the force applied to the mover 101 can be made ubiquitous in the q-axis direction, the d-axis direction and the Y-direction.

Therefore, according to the present embodiment, the force applied to the mover 101 becomes ubiquitous, so that even in a case of the small mover 101 or a case where the arrangement of the stator 201 is greatly limited, the mover 101 can be transported while floating in a non-contact state more stably.

Figure 10A:
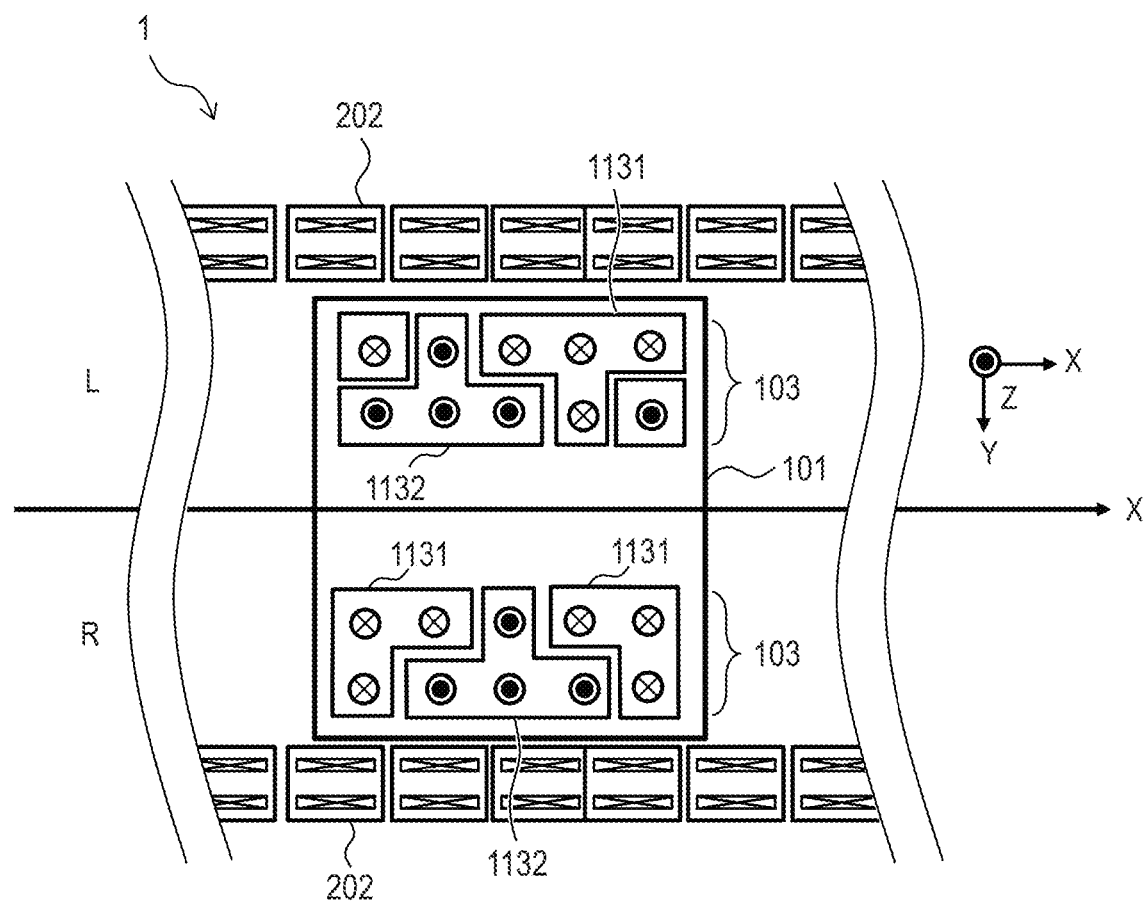
FIG. 10A is a plan view illustrating a configuration of the transport system according to the second embodiment of the present invention.
Figure 10B:
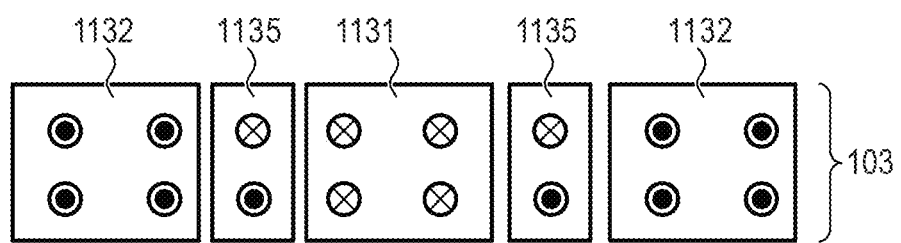
FIG. 10B is a plan view illustrating another configuration of the transport system according to the second embodiment of the present invention.

FIG. 10A is a plan view viewed from the Z direction illustrating an example of the transport system 1 including the mover 101 having the magnetic body 103 configured as illustrated in FIG. 9A and FIG. 9B. As illustrated in FIG. 10A, the magnetic body 103 installed in the mover 101 is composed of the permanent magnets 1131 and 1132 having different orientations of magnetic flux each other. The numbers and shapes of the permanent magnets 1131 and 1132 can be appropriately changed depending on the size of the mover 101. For example, as illustrated in FIG. 10B, the magnetic body 103 provided on the mover 101 may be composed of the permanent magnets 1131 and 1132 having different directions of magnetic flux and the permanent magnets 1135 magnetized along the Y direction. The permanent magnet 1135 is arranged between the permanent magnet 1131 and the permanent magnet 1132.

Third Embodiment

A third embodiment of the present invention will be described with reference to FIG. 11. Note that the same components as those in the above first and second embodiments are labeled with the same references, and the description thereof will be omitted or simplified.

In the first and second embodiments described above, the cases where the magnetic flux density distribution is formed by the plurality of physically separate and independent permanent magnets in the magnetic body 103 have been described, but the present invention is not limited thereto. A magnetic body 103 may be composed of a single permanent magnet that is magnetized in advance to have a desired magnetic flux density distribution. In the present embodiment, description will be given of a case where the magnetic body 103 is composed of a single permanent magnet 1203 which is magnetized in advance to have a desired magnetic flux density distribution.

Figure 11:
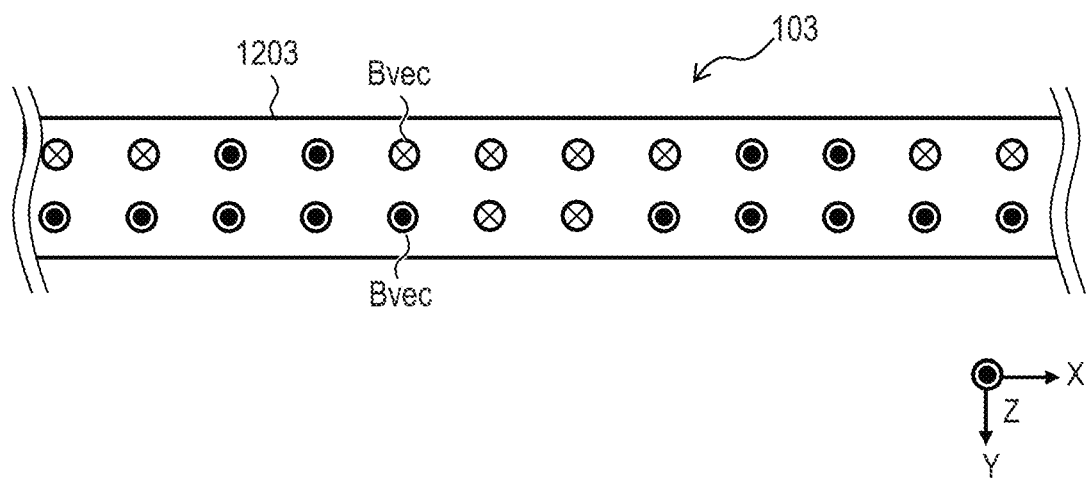
FIG. 11 is a schematic diagram illustrating a magnetic body disposed on a mover in a transport system according to a third embodiment of the present invention.

FIG. 11 is a plan view of the permanent magnets 1203 configuring the magnetic body 103 installed on the mover 101 according to the present embodiment as viewed from above along the Z direction. As illustrated in FIG. 11, in the present embodiment, the magnetic body 103 does not have a permanent magnet group but has a single permanent magnet 1203. The permanent magnet 1203 has a rectangular plane whose longitudinal direction is the X direction in a plan view viewed from above along the Z direction.

The permanent magnet 1203 is a physically undivided mass of a permanent magnet. The permanent magnet 1203 is magnetized in advance so as to have a magnetic flux density distribution that changes along the X direction, which is the transport direction, and also to have a magnetic flux density distribution that changes along the Y direction crossing the X direction at the stage of magnetization by a magnetizing apparatus at the time of manufacture. Specifically, the permanent magnet 1203 has a magnetic flux density distribution that changes periodically along the X direction, and a magnetic flux density distribution that changes in gradient along the Y direction crossing the X direction.

For example, the permanent magnet 1203 is magnetized so as to have a magnetic flux density distribution similar to that of the magnetic body 103 according to the first or second embodiment. The permanent magnet 1203 may be magnetized, for example, so as to have a magnetic flux density distribution similar to the magnetic flux density distribution of the magnetic body 103 according to a fourth embodiment described later.

As in the present embodiment, the magnetic body 103 can be composed of a single permanent magnet 1203 magnetized to have a predetermined magnetic flux density distribution instead of a plurality of physically separated permanent magnets.

Fourth Embodiment

A fourth embodiment of the present invention will be described with reference to FIG. 12A to FIG. 12D. Note that the same components as those in the above first to third embodiment are labeled with the same references, and the description thereof will be omitted or simplified.

In the first to third embodiments described above, the cases where the magnetization direction of the permanent magnet configuring the magnetic body 103 is the Z direction have been described, but the present invention is not limited thereto. In the present embodiment, a case where a permanent magnet 1201 configuring the magnetic body 103 is magnetized in the Y direction and permanent magnets 1203 and 1204 of the permanent magnet group 1202 configuring the magnetic body 103 are magnetized in the X direction will be described.

Figure 12A:
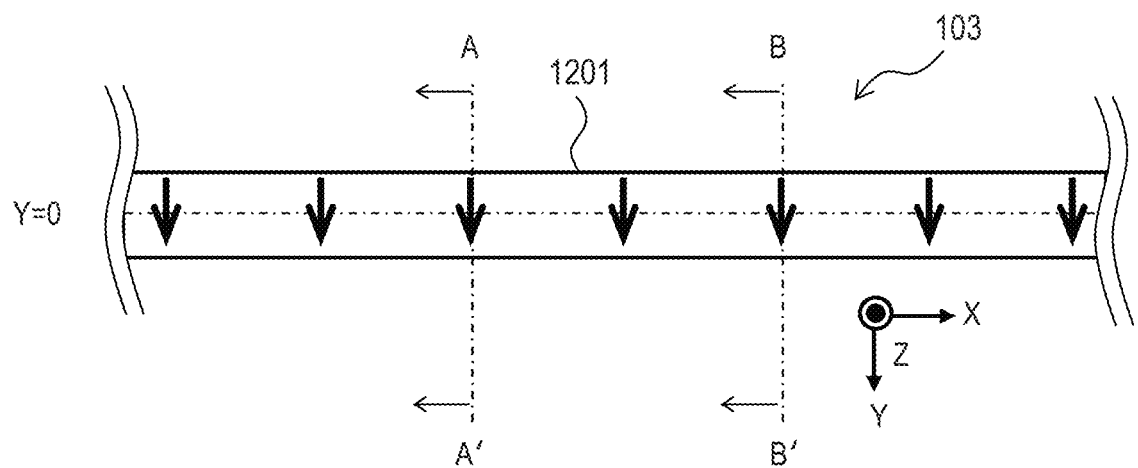
FIG. 12A is a schematic diagram illustrating a magnetic body disposed on a mover in a transport system according to a fourth embodiment of the present invention.
Figure 12B:
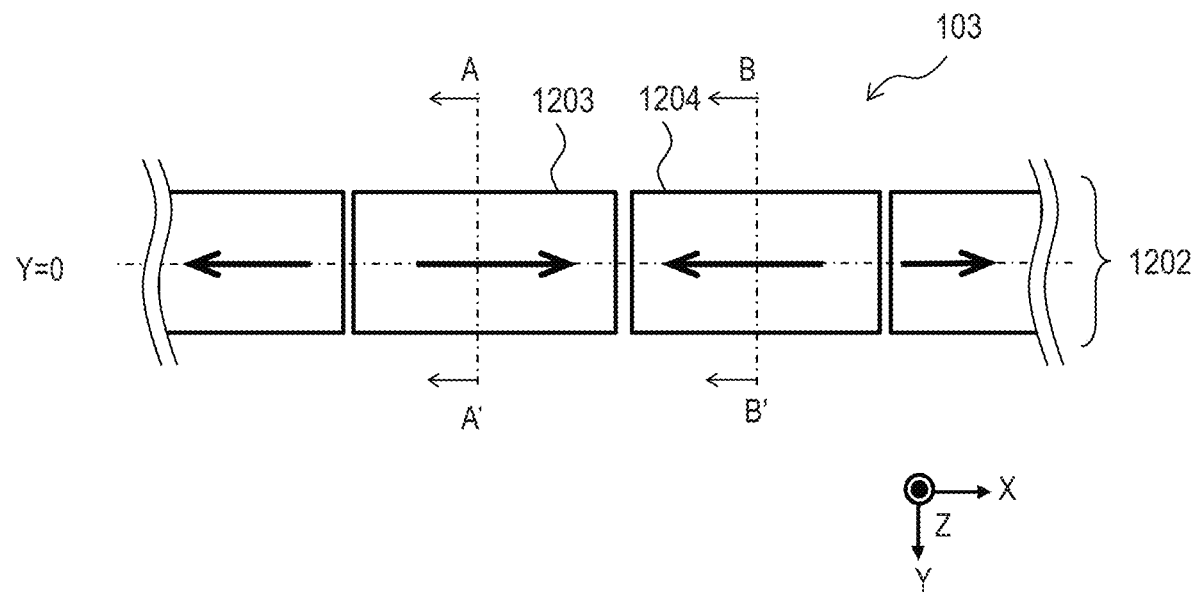
FIG. 12B is a schematic diagram illustrating magnetic bodies disposed on the mover in the transport system according to the fourth embodiment of the present invention.
Figure 12C:
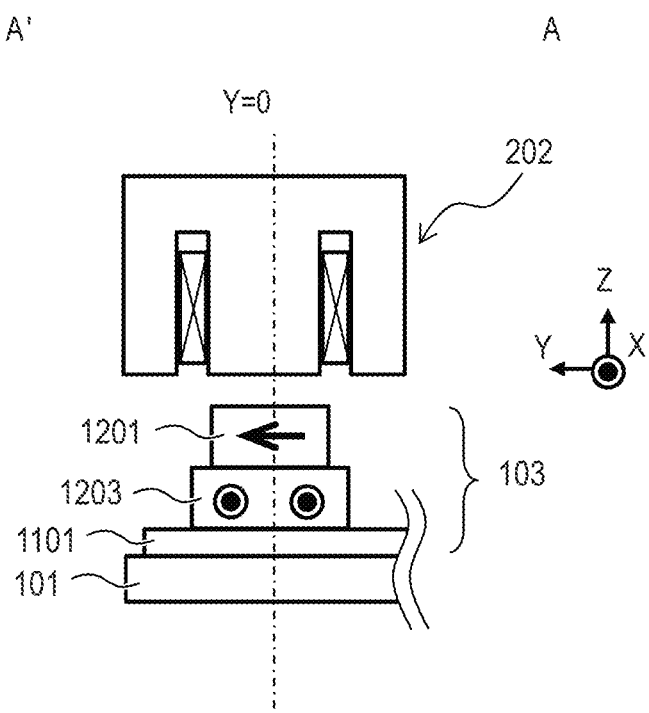
FIG. 12C is a schematic diagram illustrating the magnetic bodies disposed on the mover in the transport system according to the fourth embodiment of the present invention.
Figure 12D:
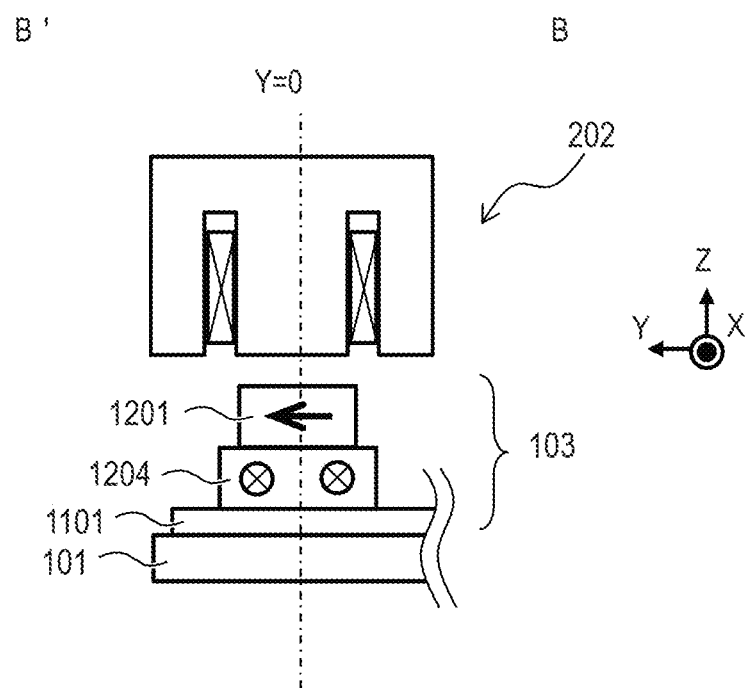
FIG. 12D is a schematic diagram illustrating the magnetic bodies disposed on the mover in the transport system according to the fourth embodiment of the present invention.

FIG. 12A is a plan view of the permanent magnet 1201 included in the magnetic body 103 as viewed from above along the Z direction. FIG. 12B is a plan view of the permanent magnets 1203 and 1204 of the permanent magnet group 1202 included in the magnetic body 103 as viewed from above along the Z direction. FIG. 12C is a cross-sectional view of the magnetic body 103 and the coil 202 facing the magnetic body 103 along the X direction, and illustrates a cross-sectional view of the magnetic body 103 and the coil 202 along the line A-A' in FIG. 12A and FIG. 12B. FIG. 12D is a cross-sectional view of the magnetic body 103 and the coil 202 facing the magnetic body 103 viewed along the X direction, and illustrates a cross-sectional view of the magnetic body 103 and the coil 202 along the line B-B' in FIG. 12A and FIG. 12B.

As illustrated in FIG. 12A to FIG. 12D, the magnetic body 103 includes a yoke plate 1101, the permanent magnet 1201, and the permanent magnet group 1202. The yoke plate 1101 is installed on the top surface of the mover 101. The permanent magnet group 1202 is installed on the yoke plate 1101 in the Z direction. The permanent magnet 1201 is installed on the permanent magnet group 1202 in the Z direction.

Thus, the yoke plate 1101, the permanent magnet group 1202 and the permanent magnet 1201 are stacked and fixed in the Z direction. In FIG. 12A to FIG. 12D, the directions of the magnetic fluxes of the permanent magnet 1201 and the permanent magnet group 1202 are indicated by arrows.

As illustrated in FIG. 12A, the permanent magnet 1201 has a long rectangular planar shape with the X direction as the longitudinal direction in a plan view viewed from the Z direction. As illustrated in FIG. 12A, FIG. 12C, and FIG. 12D, the permanent magnet 1201 is magnetized so that the magnetic flux is directed to one side along the Y direction.

As illustrated in FIG. 12B, the permanent magnet group 1202 includes a plurality of permanent magnets 1203 and a plurality of permanent magnets 1204. The permanent magnets 1203 and 1204 each have a rectangular planar shape which is shorter in the Z direction and wider in the Y direction than the permanent magnet 1201 when viewed from the Z direction. The permanent magnets 1203 and 1204 are arranged alternately along the X direction.

As illustrated in FIG. 12B to FIG. 12D, the permanent magnet 1203 is magnetized so that a magnetic flux is directed to one side (+X side) along the X direction. The permanent magnet 1204 is magnetized so that a magnetic flux is directed to the other side (−X side) along the X direction. As described above, the permanent magnets 1203 and 1204 arranged alternately in the X direction have magnetic flux directions opposite to each other along the X direction.

As in the present embodiment, the permanent magnets 1201 configuring the magnetic body 103 may be magnetized in the Y direction, and the permanent magnets 1203 and 1204 of the permanent magnet group 1202 configuring the magnetic body 103 may be magnetized in the X direction. According to the present embodiment, the magnetic body 103 can be configured so as to have a magnetic flux density distribution that changes along the direction crossing the X direction, which is the transport direction.

Note that, in the above description, the magnetic body 103 is formed by combining the permanent magnet 1201 magnetized along the Y direction and the permanent magnets 1203 and 1204 magnetized along the X direction, but the present invention is not limited thereto. The magnetic body 103 may be formed by appropriately combining permanent magnets magnetized in any orientation along the X direction, permanent magnets magnetized in any orientation along the Y direction, and permanent magnets magnetized in any orientation along the Z direction. One or more permanent magnets may be magnetized along each direction.

The magnetic body 103 can be configured to have at least two of the permanent magnets magnetized along the X direction, the permanent magnets magnetized along the Y direction, and the permanent magnets magnetized along the Z direction. A plurality of types of permanent magnets included in the magnetic body 103 having different magnetization directions can be stacked and arranged in the Z direction.

Fifth Embodiment

A fifth embodiment of the present invention will be described with reference to FIG. 13A to FIG. 17. In the first to fourth embodiments described above, the transport system 1 using a linear motor has been described, but in the present embodiment, a rotary apparatus using a rotary motor will be described. In a case of a rotary apparatus using a rotary motor, it is also required to solve the bias of force applied to the rotor and to rotate the rotor while raising it more stably. In the present embodiment, description will be given of a case where a more stable rotation of the rotor is realized by making force applied to the rotor ubiquitous in the rotary apparatus.

Figure 13A:
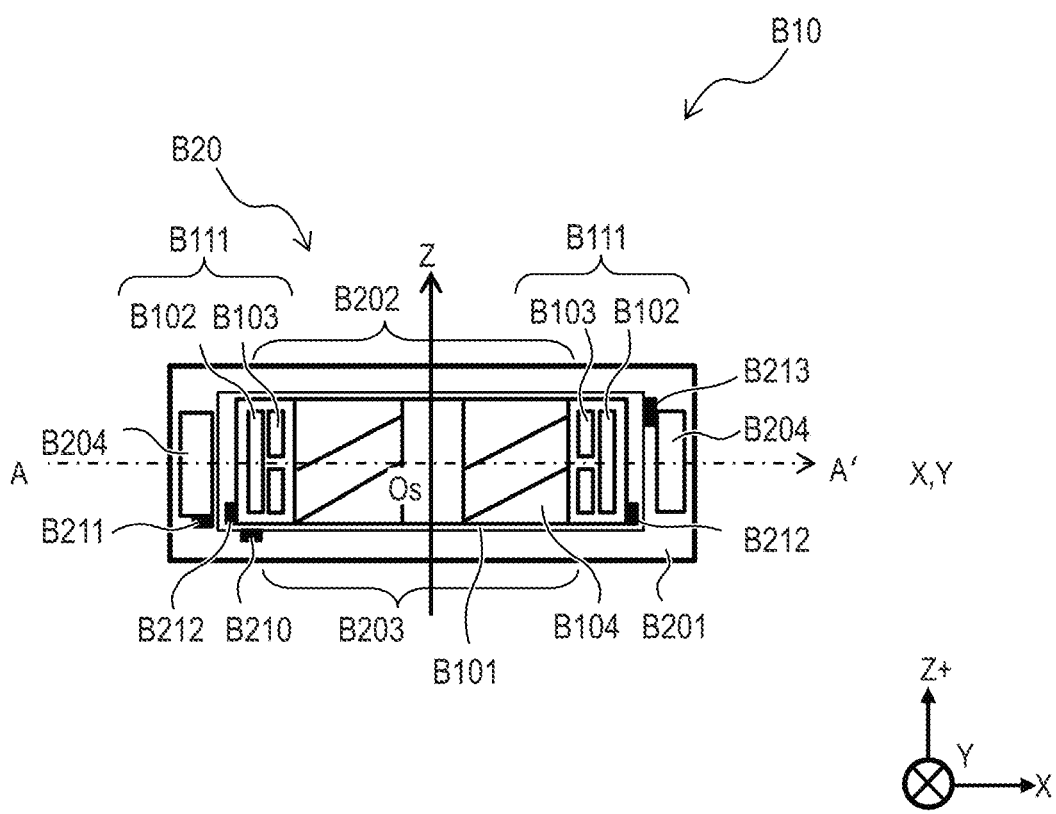
FIG. 13A is a schematic diagram illustrating a rotary apparatus according to a fifth embodiment of the present invention.
Figure 13B:
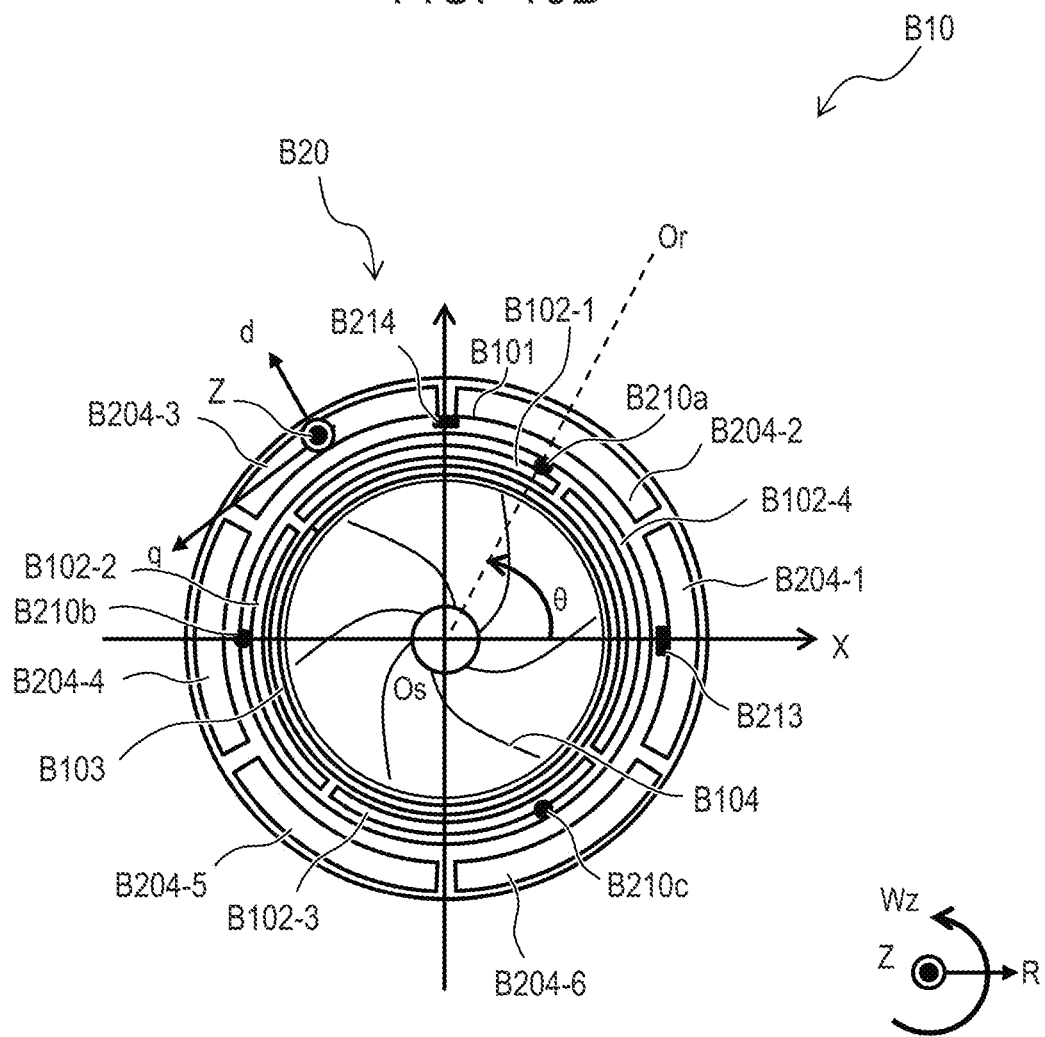
FIG. 13B is a schematic diagram illustrating the rotary apparatus according to the fifth embodiment of the present invention.
Figure 13C:
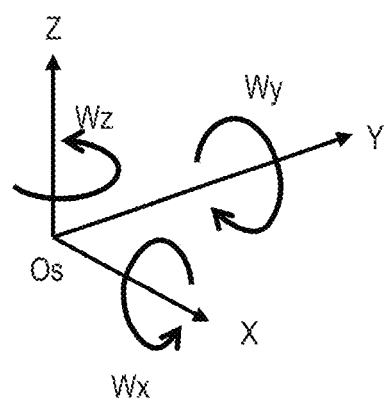
FIG. 13C is a schematic diagram illustrating coordinate axes and directions for use in describing the rotary apparatus according to the fifth embodiment of the present invention.
Figure 14:
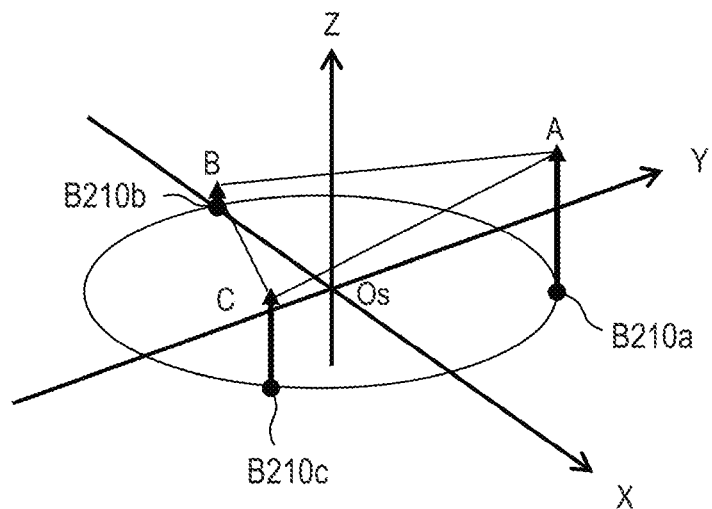
FIG. 14 is a schematic diagram illustrating a method for calculating rotor displacement in the rotary apparatus according to the fifth embodiment of the present invention.

First, the overall configuration of the rotary apparatus according to the present embodiment will be described with reference to FIG. 13A to FIG. 14. FIG. 13A is a longitudinal sectional view along a rotation axis illustrating the rotary apparatus B10 according to the present embodiment. FIG. 13B is a cross-sectional view along the line A-A' of FIG. 13A. FIG. 13B is a cross-sectional view along the XY plane at the line A-A' of FIG. 13A. FIG. 13C is a schematic diagram illustrating coordinate axes and directions used in the description of the rotary apparatus B10 below. FIG. 14 is a schematic diagram for explaining a method of calculating the displacement of a rotor B101.

As illustrated in FIG. 13A and FIG. 13B, the rotary apparatus B10 according to the present embodiment includes a rotary motor B20 having a rotor B101 that is a first portion and a stator B201 that is a second portion. The rotor B101 includes a magnetic body B111 having a permanent magnet group B112 and a permanent magnet group B113 described later. The permanent magnet group B112 includes a plurality of permanent magnets B102. The permanent magnet group B113 includes a plurality of permanent magnets B103. The stator B201 includes a plurality of coils B204. The motor B20 is a radial type magnetically floating rotary motor which rotates the rotor B101 while being floated around its axis in a non-contact state, while magnetically floating the rotor B101 along its axis direction. In this embodiment, as an example of the rotary apparatus B10 in which the motor B20 is used, a pump in which the fins B104 are attached to the rotor B101 will be described.

Here, coordinate axes used in the following description are defined. First, a Z-axis is taken as a rotation axis around which the rotor B101 described later rotates. An XY plane is taken so as to be perpendicular to the Z-axis, and an X-axis and a Y-axis are taken so as to be perpendicular to each other in the XY plane. The direction along the X-axis is defined as a X direction, the direction along the Y-axis is defined as a Y direction, and the direction along the Z-axis is defined as a Z direction. Furthermore, a rotation direction around the X-axis is defined as Wx direction, the rotation direction around the Y-axis is defined as a Wy direction, and the rotation direction around the Z-axis is defined as a Wz direction. The positive direction of each rotation in the Wx direction, the Wy direction and the Wz direction is the direction of the right screw relative to the direction in which the X-axis, the Y-axis and the Z-axis extend from the origin Os of the stator B201 which is the origin of the X-axis, the Y-axis and the Z-axis. FIG. 13C illustrates the respective axes and the respective directions. An R axis is taken in the direction in which the radius increases with the Z-axis as the central axis.

Further, symbols used in the following description are as follows.

P: state including the position and the attitude of the rotor B101 (X, Y, Z, Wx, Wy, Wz)
T: Force T applied to the rotor B101
Tx: force component in the X direction of force T
Ty: force component in the Y direction of force T
Tz: force component in the Z direction of force T
Twx: Torque component in the Wx direction of force T
Twy: Torque component in the Wy direction of force T
Twz: torque component in the Wz direction of force T
Tq: column vector whose element is (Tx, Ty, Tz, Twx, Twy, Twz)
　　j: index for identifying the coil B204
(Note that j is an integer satisfying 1≤j≤N, where N is an integer greater than or equal to two.)
N: number of installed coils B204
Ij: current value applied to the j-th coil B204
Is: column vector whose element is Ij
φj: angle of the j-th coil B204 in the Wz direction
r: radius from the center of rotation of the rotor B101 to the magnetic body B111
Eq(j, P): force in the q-axis direction working on the rotor B101 in the state P when unit current is applied to the j-th coil B204
Ed(j, P): force in the d-axis direction working on the rotor B101 in the state P when unit current is applied to the j-th coil B204
Ez(j, P): force in the Z direction working on the rotor B101 in the state P when unit current is applied to the j-th coil B204
Σ: sum when index j is changed from 1 to N In the present embodiment, a plurality of possible components, such as the permanent magnet B102, are identified by using a common B followed by a numeral unless it is particularly necessary to distinguish them, and if necessary, a plurality of possible components are individually identified by adding a numeral via "-" such as "-1" or "-2" after the numeral. For example, a plurality of coils B204 are simply referred to as "coil B204" unless it is particularly necessary to distinguish them. When it is necessary to individually identify each coil B204, each coil B204 is individually identified by indicating "coil B204-1", "coil B204-2", or the like.

Similarly, the plurality of permanent magnets B102 are simply referred to as "permanent magnets B102" unless it is necessary to distinguish them. When it is necessary to individually identify each permanent magnet B102, each permanent magnet B102 is individually identified by indicating "permanent magnet B102-1", "permanent magnet B102-2", or the like.

The stator B201 is configured as a housing having an intake port B202 and a discharge port B203. The internal space of the stator B201 is formed in a cylindrical shape with the Z-axis as the central axis. In the inner space of the stator B201, the rotor B101 having a disk-shaped outer shape is rotatably stored with the Z-axis as the rotation axis. The intake port B202 is provided on one side in the Z direction of the stator B201. The discharge port B203 is provided on the other side of the stator B201 in the Z direction. When the rotor B101 rotates in a predetermined direction as described later in a fluid such as a gas or a liquid, the rotary apparatus B10 operates as a pump because the fluid flows in from the intake port B202 and the fluid is discharged from the discharge port B203.

The stator B201 has a plurality of coils B204 arranged so as to face the rotor B101 accommodated in its internal space. The plurality of coils B204 are arranged so as to face the outer periphery of the rotor B101 along the circumferential direction of the internal space of the stator B201. The coil B204 is configured by winding a conducting wire around an iron core or an air core.

On the other hand, the rotor B101 is configured as an impeller having a disk-shaped external shape housed in the internal space of the stator B201. The rotor B101 has the magnetic body B111 and the plurality of fins B104. The magnetic body B111 includes the permanent magnet group B112 and the permanent magnet group B113 (see FIG. 15A and FIG. 15B). The permanent magnet group B112 includes the plurality of permanent magnets B102. The permanent magnet group B113 includes the plurality of permanent magnets B103. The magnetic body B111 having the permanent magnet groups B112 and B113 is installed so as to be opposed to the coil B204 of the stator B201 along the circumferential direction around the rotation axis of the rotor B101 at the outer periphery of the rotor B101. In the magnetic body B111, the permanent magnet B102 is installed on the outer circumference side than the permanent magnet B103. In order to increase the magnetic force of the magnetic body B111, a yoke plate (not shown) may be attached to the outer circumference side which is the back side of the permanent magnet B102. The rotor B101 rotates about the Z-axis in the internal space of the stator B201.

In the rotary apparatus B10, the rotor B101 housed in the internal space of the stator B201 is rotated in a predetermined direction with the Z-axis as the rotation axis while floating in the Z direction by the electromagnetic force acting between the coils B204 to which current is applied as described later and the magnetic body B111. Note that the Z direction in which the rotor B101 floats is, for example, a perpendicular direction, but may be a direction other than a perpendicular direction. When the fins B104 is attached and the rotor B101 rotates, fluid flows into the internal space of the stator B201 from the intake port B202, and the flowed fluid is discharged from the discharge port B203. Thus, the rotary apparatus B10 is operated to take in the fluid from the intake port B202, and to discharge and transfer the taken fluid from the discharge port B203. The rotary apparatus B10 may be configured to transfer a liquid as the fluid, or may be configured to transfer a gas as the fluid, for example.

The rotary apparatus B10 has an X sensor B213 and a Y sensor B214. The X sensor B213 and the Y sensor B214 are attached to be installed on the stator B201. The X sensor B213 can detect and output a distance in the X direction between the rotor B101 and the X sensor B213. The Y sensor B214 can detect and output a distance in the Y direction between the rotor B101 and the Y sensor B214.

Further, the rotary apparatus B10 has a Wz sensor B211. The Wz sensor B211 is attached to be installed on the stator B201. The Wz sensor B211 can detect and output a rotation angle of the rotor B101 in the Wz direction. A scale B212 is attached to be installed on the outer circumference surface of the rotor B101 facing the Wz sensor B211. The Wz sensor B211 can detect the rotation angle of the rotor B101 in the Wz direction by reading the pattern on the scale B 212.

Further, the rotary apparatus B10 has Z sensors B210. The Z sensors B210 are attached to be installed on the stator B201 at 3 locations. The Z sensors B210 can detect and output a distance in the Z direction to the rotor B101.

Here, a method of calculating displacements of Z, Wx and Wy of the rotor B101 from the three Z sensors B210 will be described with reference to FIG. 14. Here, Z is the position of the rotor B101 in the Z direction, Wx is the rotation angle of the rotor B101 in the Wx direction, and Wy is the rotation angle of the rotor B101 in the Wy direction.

As illustrated in FIG. 14, the Z sensors B210a, B210b, and B210c, which are the three Z sensors B210, are disposed in three locations on the XY plane. A plane ABC is formed on the basis of detection values of distances in the Z direction to the rotor B101 by each of the three Z sensors B210a, B210b, and B210c. The plane ABC can be considered as the rotor B101. From the inclination of the normal vector of the plane ABC and the distance from the origin Os to the plane ABC, the displacement (Z, Wx, Wy) of the plane ABC, that is, the rotor B101, can be calculated.

Figure 15A:
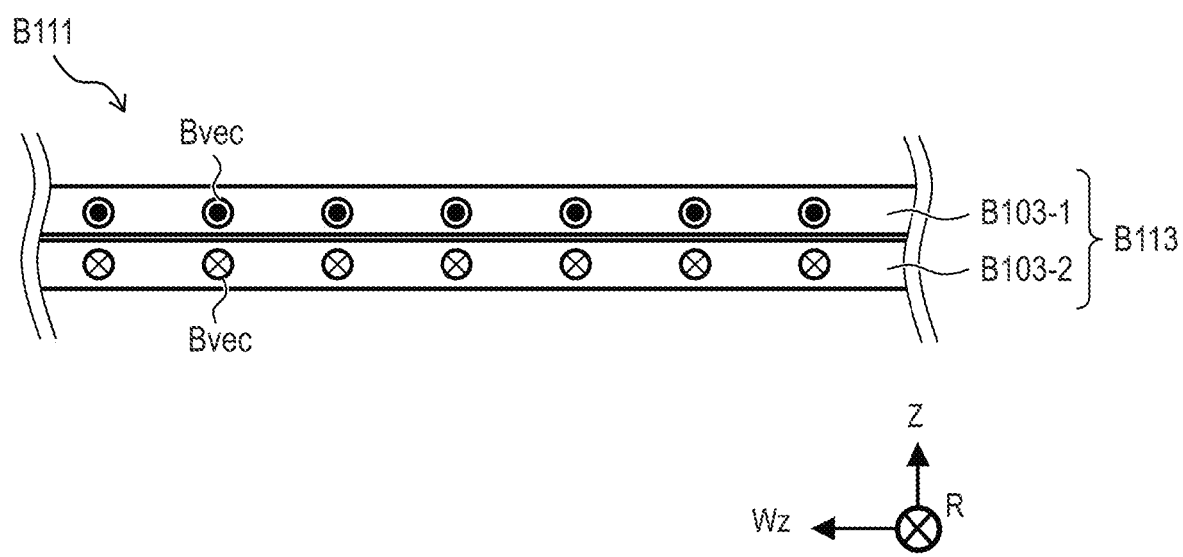
FIG. 15A is a schematic diagram explaining the fifth embodiment of the present invention.
Figure 15B:
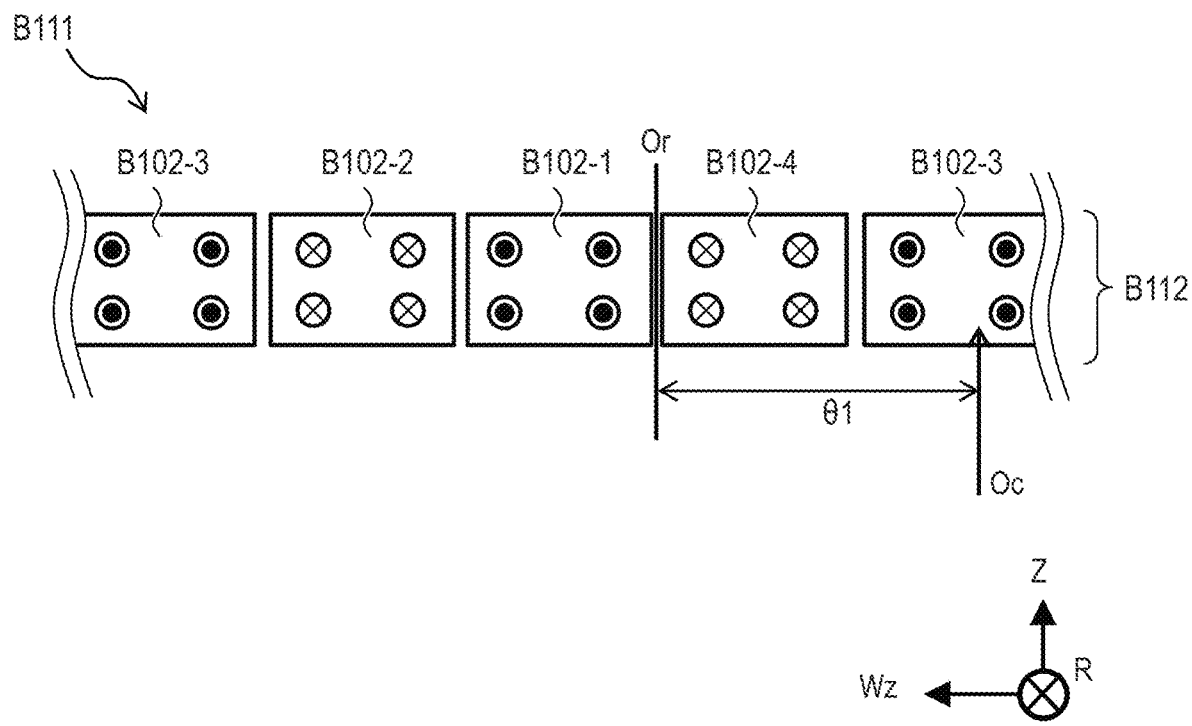
FIG. 15B is a schematic diagram explaining the fifth embodiment of the present invention.
Figure 15C:
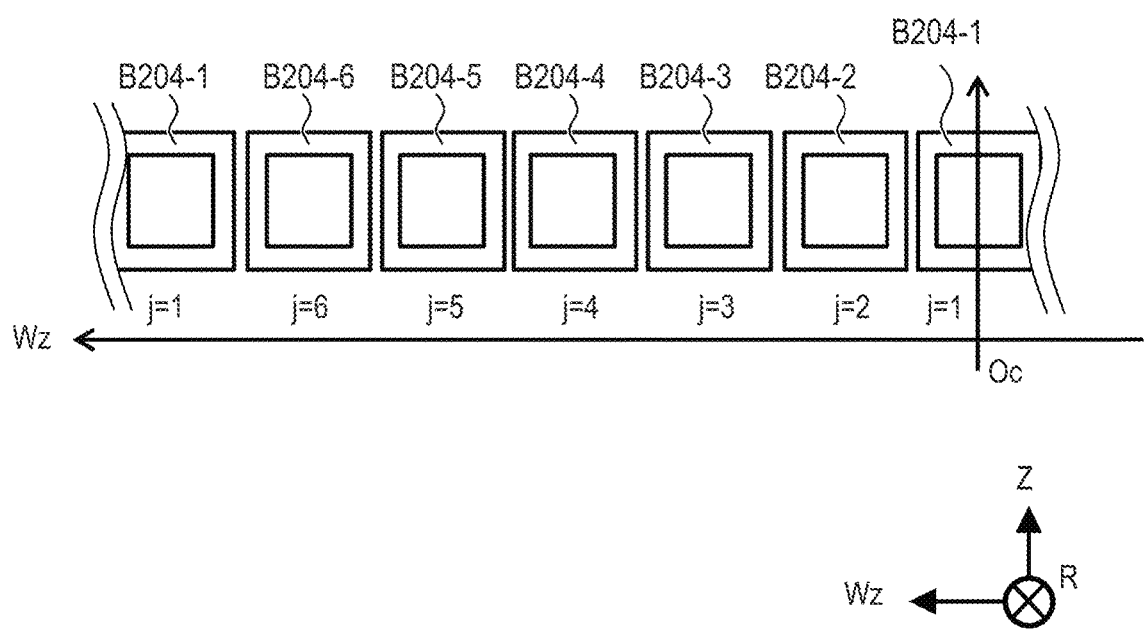
FIG. 15C is a schematic diagram explaining the fifth embodiment of the present invention.
Figure 15D:
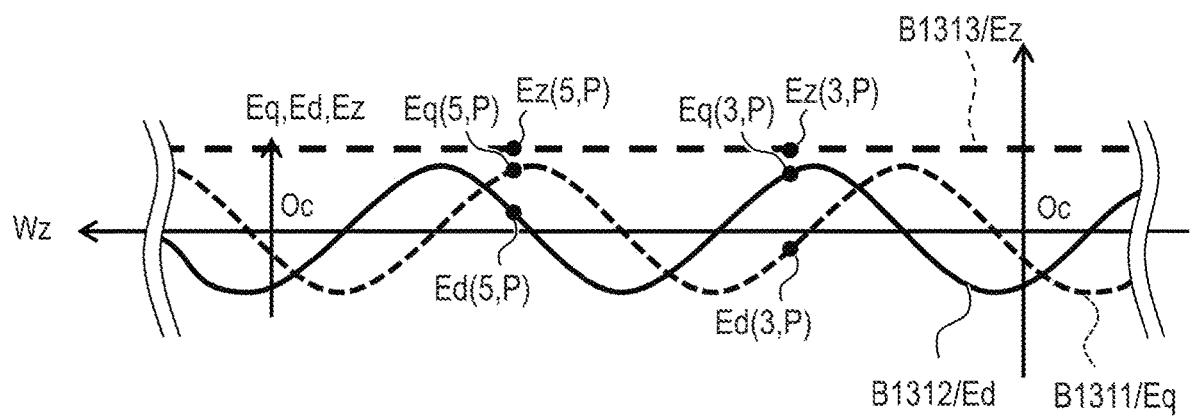
FIG. 15 D is a schematic diagram explaining the fifth embodiment of the present invention.

Next, the magnetic body B111 installed in the rotor B101 and the coil B204 installed in the stator B201 will be described in detail with reference to FIG. 15A to FIG. 15D. FIG. 15 A and FIG. 15B illustrate an example of the magnetic body B111 installed in the rotor B101. FIG. 15A is a development view of the permanent magnets B103 of the permanent magnet group B113 included in the magnetic body B111, which are developed in the Wz direction and viewed in the direction along the R axis. FIG. 15B is a development view of the permanent magnets B102 of the permanent magnet group B112 included in the magnetic body B11, which are developed in the Wz direction and viewed in the direction along the R axis. FIG. 15C is a developed view of the coil B204 installed in the stator B201, which is developed in the Wz direction and viewed in the direction along the R axis. The Wz direction is a circumferential direction around the rotation axis of the rotor B101 as the center. FIG. 15D is a graph schematically illustrating magnitudes of forces in the q-axis direction, the d-axis direction, and the Z-direction acting on the magnetic body B111 per unit current of the coil B204 facing the magnetic body B1, that is, thrust constants in each direction.

Here, the angle of the rotation angle of the rotor B101 in the Wz direction is set to θ. The reference Oc in the Wz direction on the stator B201 side is set as the center of the coil B204-1. The reference Or in the Wz direction on the rotor B101 side is set as the intermediate between the permanent magnet B102-1 and the permanent magnet B102-4. The angle θ is set as an angle from the reference Oc on the stator B201 side to the reference Or on the rotor B101 side.

As illustrated in FIG. 15A and FIG. 15B, the magnetic body B111 includes a permanent magnet group B112 and a permanent magnet group B113. The permanent magnet group B112 is disposed on the outer periphery of the rotor B101 along the circumferential direction around the rotational axis of the rotor B101 The permanent magnet group B113 is disposed inside the permanent magnet group B112 along the circumferential direction around the rotation axis of the rotor B101. Thus, the permanent magnet group B112 and the permanent magnet group B113 are arranged and fixed so as to be adjacent in the direction along the R axis. The permanent magnet group B112 and the permanent magnet group B113 are fixed to the rotor B101 by an adhesive or the like, although there may be portions which repel each other depending on the direction of the magnetic flux.

FIG. 15A and FIG. 15B schematically illustrate the directions of the magnetic fluxes flowing out of the permanent magnet groups B112 and B113 by Bvec. Bvec with a black circle in a white circle indicates the direction of the magnetic flux from the back side to the front side of the sheet plane along the direction along the R axis. Bvec with a cross in a white circle indicates the direction of magnetic flux from the front side to the back side of the sheet plane along the direction along the R axis.

As illustrated in FIG. 15A, the permanent magnet group B113 includes two permanent magnets B103-1 and B103-2. Note that the number of the permanent magnets B103 is not limited to two, and can be appropriately changed. Each of the permanent magnets B103-1 and B103-2 has a long rectangular planar shape with the Wz direction as the longitudinal direction in a plan view viewed from a direction along the R axis. The permanent magnets B103-1 and B103-2 are arranged so as to be adjacent from the upper side to the lower side in the Z direction.

The permanent magnet B103-1 is magnetized along the direction along the R axis and is magnetized so that the magnetic flux is directed from the back side to the front side of the sheet plane in FIG. 15A. The permanent magnet B103-2 is magnetized along the direction along the R axis and is magnetized so that the magnetic flux is directed from the front side to the back side of the sheet plane in FIG. 15A. As described above, the permanent magnets B103-1 and B103-2 adjacent to each other in the Z direction are magnetized in the opposite directions to each other along the direction along the R axis, and the directions of the magnetic fluxes along the direction along the R axis are opposite to each other.

As illustrated in FIG. 15B, the permanent magnet group B112 includes four permanent magnets B102-1, B102-2. B102-3, and B102-4. Note that the number of the permanent magnets B102 is not limited to four, and can be appropriately changed. Each of the permanent magnets B102-1, B102-2, B102-3, and B102-4 has a planar shape that are shorter in the Wz direction and wider in the Z direction than the permanent magnets B103-1 and B103-2 when viewed in a plan view from the direction along the R axis. The permanent magnets B102-1, B102-2, B102-3, and B102-4 are arranged in order along the Wz direction.

Among the four permanent magnets B102, the permanent magnets B102-1, B102-3 are magnetized along the direction along the R axis and are magnetized so that the magnetic flux is directed from the back side to the front side of the sheet plane in FIG. 15B. The permanent magnets B102-2 and B102-4 are magnetized along the direction along the R axis and are magnetized so that the magnetic flux is directed from the front side to the back side of the sheet plane in FIG. 15B. As described above, the permanent magnets B102-1. B102-2, B102-3, and B102-4 arranged in order along the Wz direction are magnetized alternately in the opposite directions to each other along the direction along the R axis, and the directions of the magnetic flux along the direction along the R axis are alternately opposite to each other.

As illustrated in FIG. 15C, in the stator B201, six coils B204-1, B204-2, B204-3, B204-4, B204-5, and B204-6 are installed to be arranged in order along the Wz direction. Note that the number of coils B204 is not limited to six, and can be appropriately changed. The coils B204-1, B204-2, B204-3, B204-4, B204-5, and B204-6 are disposed so as to face the magnetic body B11 of the rotor B101 in the direction along the R axis.

In this way, the permanent magnets B102 and B103 are magnetized in the direction facing the coil installed in the stator B201. For example, the surfaces of the permanent magnets B102-1, B102-3, and B103-1 facing the coil B204 are magnetized to the N pole, and the surfaces of the permanent magnets B102-2, B102-4, and B103-2 facing the coil B204 are magnetized to the S pole. The magnetization directions of the permanent magnets B102 and B103 may be opposite to these directions.

As described above, in the present embodiment, the plurality of types of permanent magnets B102 and B103 having different directions of magnetic fluxes and different shapes are superposed to form the magnetic body B111. Since a plurality of types of permanent magnets B102 and B103 are superposed, the magnetic body B11 has a magnetic flux density distribution that changes along the Wz direction (the q-axis direction) which is the rotational direction, and also has a magnetic flux density distribution that changes along the Z direction crossing the Wz direction.

That is, the magnetic body B111 has a magnetic flux density distribution that changes periodically along the Wz direction by the permanent magnets B102-1, B102-2, B102-3, and B102-4 that are alternately arranged in the Wz direction and whose magnetic flux directions are opposite to each other included in the permanent magnet group B112. The permanent magnets B102-1, B102-2, B102-3, and B102-4 forming the magnetic flux density distribution contribute to the application of force in the Wz direction and the d-axis direction to the rotor B101 including the magnetic body B111.

Further, the magnetic body B111 has a magnetic flux density distribution that changes along the Z direction by the permanent magnets B103-1 and B103-2 that are adjacent to each other in the Z direction and have the opposite directions of magnetic fluxes included in the permanent magnet group B113 arranged inside the permanent magnet group B112. The permanent magnets B103-1 and B103-2 forming the magnetic flux density distribution contribute to the application of force in the Z direction to the rotor B101 including the magnetic body B111.

Thus, on the side of the magnetic body B111 facing the coil B204, a magnetic flux density distribution is formed in which the magnitude of the magnetic flux intersecting the winding of the coil B204 changes in either direction when the relative positions of the magnetic body B111 with respect to the coil B204 in the Wz direction and the Z direction change.

FIG. 15D illustrates thrust constant profiles B1311, B1312, and B1313 in the q-axis direction, d-axis direction, and Z-direction when the angle θ of the rotor B101 is θ1. The thrust constant profile B1311 in the q-axis direction schematically illustrates force in the q-axis direction, that is, a thrust constant Eq in the q-axis direction, applied to the magnetic body B111 when a unit current is applied to the coil B204. The thrust constant profile B1312 in the d-axis direction schematically illustrates force in the d-axis direction, that is, a thrust constant Ed in the d-axis direction, applied to the magnetic body B111 when a unit current is applied to the coil B204. The thrust constant profile B1313 in the Z-direction schematically illustrates force in the Z-direction, that is, a thrust constant Ez in the Z-direction, applied to the magnetic body B111 when a unit current is applied to the coil B204

The q-axis and d-axis referred to herein are the q-axis and d-axis in the motor control theory, respectively. FIG. 13B illustrates the directions of the q-axis and the d-axes with respect to the coil B204-3, as a typical example. The q-axis direction corresponds to the Wz direction, which is the circumferential direction, and the d-axis direction corresponds to the direction along the R-axis, which is the radial direction.

The magnitudes of the thrust constants Eq. Ed, and Ez differ depending on the angle θ of the rotor B101 and the index j of the coil B204. In FIG. 15D, the first argument of the thrust constants Eq, Ed, and Ez represents the index j (1 to 4) of the coil B204, and the second argument represents the state P of the rotor B101. The thrust constants Eq, Ed, and Ez can be expressed as Eq(j, P), Ed(j, P), and Ez(j, P) using the index i and the state P, respectively.

As described above, in the present embodiment, since the magnetic flux density distribution formed by the magnetic body B111 also changes along the Z direction, as illustrated in FIG. 15D, force in the Z direction can be applied to the rotor B101 in the Z direction by exerting force in the Z direction on the magnetic body B111. That is, a motor controller B301 described below can control the current applied to the plurality of coils B204 to apply force to the magnetic body B111 in the q-axis direction, the d-axis direction crossing the q-axis direction, and the Z-axis direction crossing the q-axis direction and the d-axis direction.

Thus, in the present embodiment, the force applied to the rotor B101 including the magnetic body B111 can be applied in the q-axis direction, the d-axis direction, and the Z-direction, so that the force applied to the rotor B101 can be made ubiquitous in the q-axis direction, the d-axis direction, and the Z-direction.

Therefore, according to the present embodiment, the rotor B101 can be rotated while floating in a non-contact state more stably by making the force applied to the rotor B101 ubiquitous.

Figure 16:
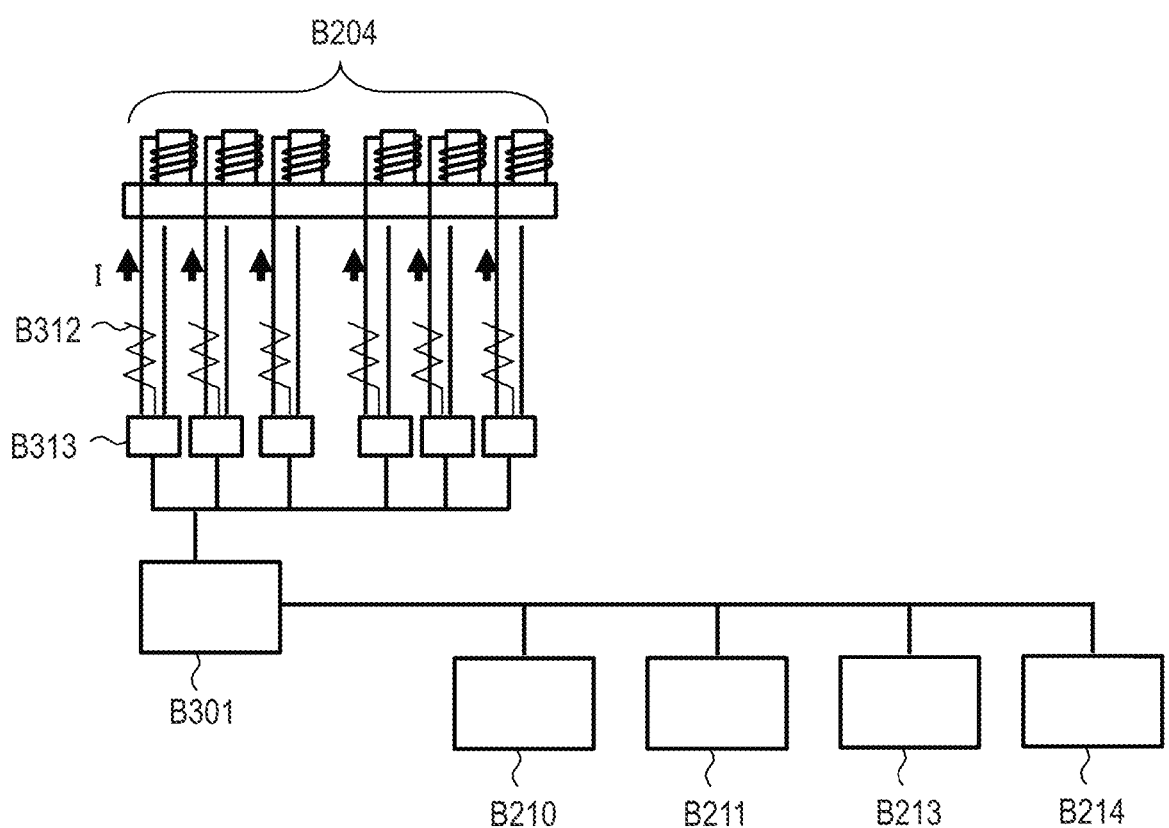
FIG. 16 is a schematic diagram illustrating a control unit of the rotary apparatus according to the fifth embodiment of the present invention.

As illustrated in FIG. 16, the rotary apparatus B10 is provided with a motor controller B301 which is a control unit that controls the rotary apparatus B10. The motor controller B301 is a control unit that executes a control program to control the rotor B101 by executing, for example, processes related to control of the attitude of the rotor B101, the rotational speed of the rotor B101, and the like. The motor controller B301 will be further described with reference to FIG. 16. FIG. 16 is a schematic diagram illustrating the motor controller B301 that controls the rotary apparatus B10. The motor controller B301 may form a part of the rotary apparatus B10.

As illustrated in FIG. 16, current controllers B313 each of which is provided for each coil B204 are connected to the motor controller B301. The coil B204 is connected to each current controller B313. A current sensor B312 is connected to each current controller B313. The Z sensors B210, the Wz sensor B211, the X sensor B213, and the Y sensor B214 are connected to the motor controller B301.

The motor controller B301 can detect the displacement (X, Y, Z, Wx, Wy, Wz) of the rotor B101 based on the detection values from the Z sensors B210, the Wz sensor B211, the X sensor B213, and the Y sensor B214.

Further, the motor controller B301 has a control program and a clock built in therein, and can calculate a current value corresponding to the detected displacement of the rotor B101 to calculate a current command value indicating a current for applying current to each coil B204.

Each of the current controllers B313 can detect the current value of coil B204 using the connected current sensor B312. Further, each of the current controllers B313 can independently apply a predetermined current to the coil B204 according to the detection result while detecting the current amount by the current sensor B312 according to the current command value from the motor controller B301.

Figure 17:
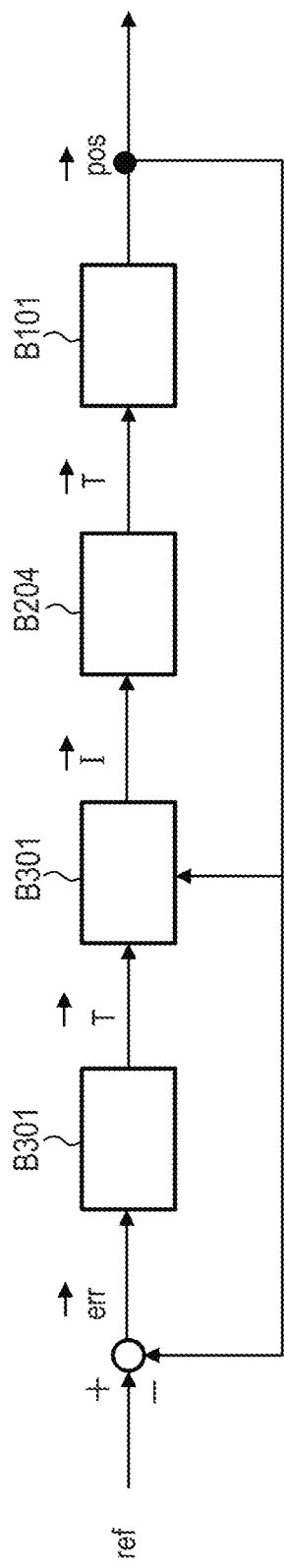
FIG. 17 is a schematic diagram illustrating an example of a control block for controlling the position and the attitude of the rotor in the rotary apparatus according to the fifth embodiment of the present invention.

Next, an attitude control method of the rotor B101 by the motor controller B301 will be described with reference to FIG. 17. FIG. 17 schematically illustrates a control loop for calculating the magnitude of the force applied to the rotor B101.

In FIG. 17, ref is a target value of displacement of the rotor B101, and pos is displacement of the rotor B101 obtained from the sensor group. The sensor group includes the Z sensors B210, the Wz sensor B211, the X sensor B213, and the Y sensor B214.

As illustrated in FIG. 17, the motor controller B301 calculates force T applied to the rotor B101 from the difference err between the target value ref and the displacement pos. The motor controller B301 may be, for example, a controller based on PID control or a controller using a filter as appropriate according to the characteristics of the rotor B101. Such a controller can stabilize the attitude of the rotor B101.

The motor controller B301 calculates current I to be applied to each coil B204 from the force T and the displacement pos. Each current controller B313 applies current corresponding to the current I calculated by the motor controller B301 to the coil B204.

Thus, w % ben the current is applied to each coil B204, the force T, which is an electromagnetic force, is generated between the coil B204 and the rotor B101, and the force T acts on the rotor B101 to rotate the rotor B101. While the rotor B101 rotates, detection of the displacement pos and application of current to each coil B204 are repeated.

The motor controller B301 controls a torque vector Tq including force components Tx, Ty, and Tz and torque components Twx, Twy, and Twz of the force T applied to a rotor B101 as elements. Thus, the motor controller B301 rotates the rotor B101 while controlling the attitude (X, Y, Z, Wx, Wy) of the rotor B101. The torque vector Tq is a column vector represented by the following Equation (B1).

$$Tq=(Tx,Ty,Tz,Twx,Twy,Twz) \qquad \text{Equation (B1)}$$

Here, a coil current vector Is, which is a column vector indicating a current to be applied to the coil B204, is defined by the following Equation (B2). The following Equation (B2) illustrates the coil current vector Is when the number N of the coils B204 is six.

$$Is=(I1,I2,I3,I4,I5,I6) \qquad \text{Equation (B2)}$$

Hereinafter, it will be explained that by moving the magnetic field generated in the coil B204 in accordance with the rotation of the rotor B101, the torque vector Tq can be applied to the rotor B101 at an arbitrary rotation angle in the Wz direction of the rotor B101.

The elements of the torque vector Tq are represented by the following Equations (B3-1) to (B3-6), respectively.

$$Tx=\Sigma\{(-Eq(j,P)*\sin(\phi j)+Ed(j,P)*\cos(\phi j))*Ij\} \qquad \text{Equation (B3-1)}$$

$$Ty=\Sigma\{(Eq(j,P)*\cos(\phi j)+Ed(j,P)*\sin(\phi j))*Ij\} \qquad \text{Equation (B3-2)}$$

$$Tz=\Sigma(Ed(j,P)*Ij) \qquad \text{Equation (B3-3)}$$

$$Twx=\Sigma(Ed(j,P)*r*\sin(\phi j)*Ij) \qquad \text{Equation (B3-4)}$$

$$Twy=\Sigma(-Eq(j,P)*r*\cos(\phi j)*Ij) \qquad \text{Equation (B3-5)}$$

$$Twz=\Sigma(Eq(j,P)*r*Ij) \qquad \text{Equation (B3-6)}$$

In order to apply the desired torque vector Tq, the current Ij satisfying the above equation (B3-1) to (B3-6) is calculated as follows.

Here, the torque contribution matrix M is defined. Each element of the torque contribution matrix M is a coefficient for the current Ij of each Equations (B3-1) to (B3-6). The torque contribution matrix M is a matrix of six rows by N columns representing the magnitude of contribution to each force component and torque component (Tx, Ty, Tz, Twx, Twy, Twz) when a unit current is applied to each of the 1st to Nth coils B204 and when the rotor B101 is in a state P. The respective element $M(1,j)$ to $M(6,j)$ of the j-th column from the first row on the j-th column to the sixth row on the j-th column of the torque contribution matrix M is represented by the following equations (B3-1') to (B3-6'), respectively.

$$M(1,j)=-Eq(j,P)*\sin(\phi j)+Ed(j,P)*\cos(\phi j) \qquad \text{Equation (B3-1')}$$

$$M(2,j)=Eq(j,P)*\cos(\phi j)+Ed(j,P)*\sin(\phi j) \qquad \text{Equation (B3-2')}$$

$$M(3,j)=Ez(j,P) \qquad \text{Equation (B3-3')}$$

$$M(4,j)=Ed(j,P)*r*\sin(\phi j) \qquad \text{Equation (B3-4')}$$

$$M(5,j)=-Eq(j,P)*r*\cos(\phi j) \qquad \text{Equation (B3-5')}$$

$$M(6,j)=Eq(j,P)*r \qquad \text{Equation (B3-6')}$$

Then, the Equations (B3-1) to (B3-6) can be expressed by the following Equation (B4-1) using the torque contribution matrix M, the coil current vector Is, and the torque vector Tq.

$$Tq=M*Is \qquad (B4-1)$$

Here, a pseudo current vector K is introduced here. The pseudo current vector K is a column vector having six rows by one column and is a vector satisfying the following Equation (B4-2) when Tr(M) is a transpose matrix of the torque contribution matrix M.

$$Tr(M)*K=Is \qquad \text{Equation (B4-2)}$$

Equation (B4-1) can be transformed into the following Equation (B4-3) using the Equation (B4-2).

$$Tq=M*Tr(M)*K \qquad \text{Equation (B4-3)}$$

Here, M*Tr(M) is a product of a matrix of six rows by N columns and its transpose matrix, and thus M*Tr(M) is a square matrix of six rows by six columns and has an inverse matrix. Thus, Equation (B4-3) can be transformed into the following Equation (B4-4).

$$Inv(M*Tr(M))*Tq=K \qquad \text{Equation (B4-4)}$$

By substituting Equation (B4-4) into Equation (B4-2), the coil current vector Is expressed by the following Equation (B4-5) is obtained.

$$Tr(M)*Inv(M*Tr(M))*Tq=Is \qquad \text{Equation (B4-5)}$$

By calculating the coil current vector Is as described above, the current to be applied to each coil B204 can be determined. Thus, the force component Tx in the X direction, the force component Ty in the Y direction, the force component Tz in the Z direction, the torque component Twx in the Wx direction, the torque component Twy in the Wy direction, and the torque component Twz in the Wz direction can be independently applied to the rotor B101. Therefore, according to the present embodiment, the rotor B101 can be rotated w % bile floating in a non-contact state more stably.

Note that the positional relationship between the coil B204 and the magnetic body B111, the specific configuration of the magnetic body B111, and the like are not limited to the above cases. For example, in FIG. 13A and FIG. 13B, the coil B204 may be disposed inside the permanent magnets B103 and B103. In this case, the fins B104 may be arranged outside the rotor B101. Further, for example, the rotor B101 may be rotated by installing the magnetic body B111 on the stator B201 side and the coils B204 on the rotor B101 side, and installing a battery for applying current to the coils B204 on the rotor B101. That is, contrary to the above, where the first portion including the magnetic body B111 is the rotor B101 and the second portion including the plurality of coils B204 is the stator B201, the first portion including the magnetic material B111 may be the stator and the second portion including the plurality of coils B204 may be the rotor.

Further, the magnetic body B111 may be configured in the same manner as the magnetic body 103 according to the second to fourth embodiments in which the permanent magnets are arranged or magnetized. Also in this case, the force applied to the rotor B101 can be made ubiquitous in the q-axis direction, the d-axis direction and the Z-direction.

MODIFICATION EMBODIMENTS

The present invention is not limited to the embodiments described above, and various modifications are possible.

For example, although the cases where the position and the attitude of the mover 101 are controlled in the X direction, the Y direction, the Z direction, the Wx direction, the Wy direction, and the Wz direction have been described as examples in the above embodiments, the embodiment is not limited thereto. The displacement may be acquired in at least any one of directions of the X direction, the Y direction, the Z direction, the Wx direction, the Wy direction, and the Wz direction to control the position and the attitude.

Further, the cases where the plurality of coils 202 are arranged in two lines have been described as an example in the above embodiments, but the embodiment is not limited thereto. The coils 202 can be arranged in a predetermined number of lines according to the magnetic body 103 arranged on the mover 101.

Further, the transport system according to the present invention can be used as a transport system that transports a workpiece together with a mover to an operation area of each process apparatus such as a machine tool that performs each operation process on the workpiece that is an article in a manufacturing system that manufactures an article such as an electronic device. The process apparatus that performs the operation process may be any apparatus such as an apparatus that performs assembly of a component to a workpiece, an apparatus that performs painting, or the like. Further, the article to be manufactured is not limited to a particular article and may be any component.

As described above, the transport system according to the present invention can be used to transport a workpiece to an operation area, perform an operation process on the workpiece transported in the operation area, and manufacture an article.

Further, the case where the magnetic body B111 is provided in the rotor B101, and a plurality of coils B204 are provided in the stator B201 has been described as an example in the above embodiments, but the embodiment is not limited thereto. The magnetic body B111 and the plurality of coils B204 may be interchanged to be installed in the rotor B101 that is the first portion and the stator B201 that is the second portion. That is, the rotor B101 may be provided with the plurality of coils B204, and the stator B201 may be provided with the magnetic body B111.

Further, the case where the pump in which the fins B104 are attached to the rotor B101 has been described as an example of the rotary apparatus B10 in which the motor B20 is used in the above embodiment, but the present embodiment is not limited thereto. In addition to a pump, a high speed rotating machine, a high speed spindle for a machine tool, an artificial heart, or the like can be configured as a rotary apparatus using the motor B20. Also, a rotating member rotating together with the rotor B101 can be configured in accordance with the rotary apparatus.

According to the present invention, even in a case of a small mover or in a case where there is a large restriction on the arrangement of a stator, the mover can be more stably transported in a non-contact state.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-123574, filed Jul. 28, 2021, which is hereby incorporated by reference herein in its entirety.

What is claimed is:

1. A transport system comprising:
a mover that includes at least one magnetic body;
a stator that includes a plurality of coils arranged in a first direction to be able to face the at least one magnetic body and applies force to the at least one magnetic body by the plurality of coils to which current is applied; and
a control unit that controls the current applied to the plurality of coils to apply the force to the at least one magnetic body in the first direction, a second direction crossing the first direction, and a third direction crossing the first direction and the second direction,
wherein the at least one magnetic body includes at least two of a first permanent magnet magnetized along the first direction, a second permanent magnet magnetized along the second direction, and a third permanent magnet magnetized along the third direction.

2. The transport system according to claim 1, wherein the at least one magnetic body has a first magnetic flux density distribution that changes along the first direction and a second magnetic flux density distribution that changes along the third direction.

3. The transport system according to claim 2, wherein the first magnetic flux density distribution changes periodically along the first direction.

4. The transport system according to claim 1, wherein the plurality of coils are arranged so as to be able to face the at least one magnetic body along the second direction.

5. The transport system according to claim 1, wherein the at least one magnetic body includes a first permanent magnet group and a second permanent magnet group stacked in the second direction,
wherein the first permanent magnet group includes:
a first permanent magnet magnetized along the second direction; and
a second permanent magnet magnetized opposite to the first permanent magnet along the second direction,
wherein the first permanent magnet and the second permanent magnet are arranged so as to be adjacent in the third direction,
wherein the second permanent magnet group includes:
a third permanent magnet magnetized along the second direction; and
a fourth permanent magnet magnetized opposite to the third permanent magnet along the second direction, and
wherein the third permanent magnet and the fourth permanent magnet are arranged so as to be arranged alternately along the first direction.

6. The transport system according to claim 1, wherein the at least one magnetic body includes:
a first permanent magnet magnetized along the second direction; and a second permanent magnet magnetized opposite to the first permanent magnet along the second direction, wherein the first permanent magnet and the second permanent magnet are arranged so as to be arranged alternately along the first direction, and wherein the first permanent magnet and the second permanent magnet adjacent to each other in the first direction are partially adjacent to each other in the third direction.

7. The transport system according to claim 6, wherein each of the first permanent magnet and the second permanent magnet has a shape a width of which changes in the third direction.

8. The transport system according to claim 1, wherein the at least one magnetic body includes:

a first permanent magnet magnetized along the second direction; and a second permanent magnet magnetized opposite to the first permanent magnet along the second direction; and a third permanent magnet magnetized along the third direction, wherein the first permanent magnet and the second permanent magnet are arranged so as to be arranged alternately along the first direction, and wherein the third permanent magnet is arranged between the first permanent magnet and the second permanent magnet.

9. The transport system according to claim 1, wherein the at least one magnetic body is composed of a single permanent magnet, and wherein the single permanent magnet is magnetized to have a first magnetic flux density distribution that changes along the first direction and a second magnetic flux density distribution that changes along the third direction.

10. The transport system according to claim 1, wherein at least two of the first permanent magnet, the second permanent magnet, and the third permanent magnet included in the at least one magnetic body are stacked in the second direction.

11. The transport system according to claim 1, comprising a detection unit that detects a position and an attitude of the mover that moves in the first direction, wherein the control unit controls the current applied to the plurality of coils based on the position and the attitude of the mover.

12. The transport system according to claim 1, wherein the second direction is a perpendicular direction.

13. A processing system comprising:

the transport system according to claim 1; and a process apparatus that performs processing on a workpiece transported by the mover.

14. An article manufacturing method for manufacturing an article by using the processing system according to claim 13, the article manufacturing method comprising steps of:

transporting the workpiece by using the mover; and performing, by using the process apparatus, the processing on the workpiece transported by the mover.

15. A motor comprising:

a first portion that includes at least one magnetic body; and a second portion that includes a plurality of coils and applies force to the at least one magnetic body by the plurality of coils to which current is applied, wherein the first portion or the second portion is configured to be rotatable with a rotation axis as a center, wherein the at least one magnetic body is arranged in a first direction that is a circumferential direction with the rotation axis as a center, and wherein the plurality of coils are arranged so as to face the at least one magnetic body, the motor further comprising:

a control unit that controls the current applied to the plurality of coils to apply the force to the at least one magnetic body in the first direction, a second direction crossing the first direction, and a third direction crossing the first direction and the second directions.

16. The motor according to claim 15, wherein the at least one magnetic body has a first magnetic flux density distribution that changes along the first direction and a second magnetic flux density distribution that changes along the third direction.

17. The motor according to claim 16, wherein the first magnetic flux density distribution changes periodically along the first direction.

18. The motor according to claim 15, wherein the rotation axis is an axis along the third direction.

19. The motor according to claim 15, wherein the at least one magnetic body includes a first permanent magnet group and a second permanent magnet group stacked in the second direction, wherein the first permanent magnet group includes:

a first permanent magnet magnetized along the second direction; and a second permanent magnet magnetized opposite to the first permanent magnet along the second direction, wherein the first permanent magnet and the second permanent magnet are arranged so as to be adjacent in the third direction, wherein the second permanent magnet group includes:

a third permanent magnet magnetized along the second direction; and a fourth permanent magnet magnetized opposite to the third permanent magnet along the second direction, and wherein the third permanent magnet and the fourth permanent magnet are arranged so as to be arranged alternately along the first direction.

* * * * *